United States Patent [19]
Maeda

[11] Patent Number: 5,977,976
[45] Date of Patent: *Nov. 2, 1999

[54] FUNCTION SETTING APPARATUS

[75] Inventor: Masamine Maeda, Chiba, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/634,609

[22] Filed: Apr. 18, 1996

[30] Foreign Application Priority Data

Apr. 19, 1995 [JP] Japan .................................... 7-093752
Apr. 19, 1995 [JP] Japan .................................... 7-093753
Jun. 27, 1995 [JP] Japan .................................... 7-160927

[51] Int. Cl.$^6$ ........................................................ C06K 15/00
[52] U.S. Cl. ............................................ 345/353; 345/339
[58] Field of Search .................................... 395/339, 326, 395/327, 328, 333, 335, 336, 352, 359, 353, 329, 330, 331, 332, 334, 337–338, 340–351; 348/333–334

[56] References Cited

U.S. PATENT DOCUMENTS

| | | | |
|---|---|---|---|
| 5,113,481 | 5/1992 | Smallwood et al. .......................... | 395/2 |
| 5,260,837 | 11/1993 | Lemelson ................................. | 360/35.1 |
| 5,379,159 | 1/1995 | Lemelson ................................. | 360/35.1 |
| 5,446,599 | 8/1995 | Lemelson ................................. | 360/35.1 |
| 5,481,622 | 1/1996 | Gerhardt et al. ......................... | 382/103 |
| 5,541,655 | 7/1996 | Kaneda .................................... | 348/333 |
| 5,550,754 | 8/1996 | McNelley et al. ....................... | 364/514 |
| 5,561,482 | 10/1996 | Miyake .................................... | 351/208 |
| 5,577,733 | 11/1996 | Downing ................................. | 273/348 |
| 5,579,048 | 11/1996 | Hirasawa ................................. | 348/333 |
| 5,604,818 | 2/1997 | Saitou et al. ............................ | 382/128 |

*Primary Examiner*—Steven P. Sax
*Attorney, Agent, or Firm*—Morgan & Finnegan, L.L.P.

[57] ABSTRACT

When the eye selection mode is set, upper-level menu items "EFFECT" and "FADER" are displayed. When an operator gazes "EFFECT", functions "TELESCOPE-CONTROL", "FREEZE", "MOSAIC", and the like are displayed as lower-level menu items of the item "EFFECT". When the operator gazes "MOSAIC" next, mosaic processing is executed. On the other hand, when the operator gazes the upper-level menu item "FADER", functions "OVERLAP", "WIPE", "TRIGGERED FADE", and the like are displayed. When the operator gazes "TRIGGERED FADE", corresponding processing is executed.

23 Claims, 23 Drawing Sheets ic devices available nowadays. FIG. 1 shows a conventional method for changing the setting contents of functions of the main unit by a user.

FUNCTION SETTING APPARATUS

BACKGROUND OF THE INVENTION

The present invention relates to a user interface and, more particularly, to a setting apparatus which set a function in a given main device on the basis of the line of sight of an operator.

Many functions are provided on the main units of electronic devices available nowadays. FIG. 1 shows a conventional method for changing the setting contents of functions of the main unit by a user.

Assume that a main device shown in FIG. 1 corresponds to a video camcorder and has a viewfinder 50, a "MENU" key 40, "NEXT" key 41, and "±ADVANCE" keys 42. The video camcorder as the main unit has, as one of its functions, a function of setting the internal time of the camcorder to be the local time of a place designated by an operator.

A case will be examined below wherein a user designates a place name, the local time of which is to be set. For this purpose, the user has to select a function of setting the local time from many functions of the camcorder, and then designate the place name or his or her choice. In the prior art shown in FIG. 1, the function is selected by designating an item "TIME ZONE" on the menu screen.

For this purpose, the user depresses the "MENU" key 40 first. Upon depression of the key 40, a menu shown in FIG. 1 is displayed on a screen area 50a in the viewfinder 50. Subsequently, the user depresses the "NEXT" key 41. The key 41 sequentially moves a cursor indicated by a mark "→" on the menu. The user moves the mark "→" to the position of the item "TIME ZONE" on the menu by depressing the "NEXT" key 41. In the example shown in FIG. 1, "SYDNEY" is selected as the place, as shown in a screen area 50b. Also, on a screen area 50d in the viewfinder 50, place names (Tokyo, Sydney, Hongkong, and Bangkok in this case) in this device are displayed.

The user selects the place name, the time of which is to be displayed, by depressing the "−" or "+" key. For example, upon depression of the "+" key, the displayed place name changes clockwise, i.e., in the order of "TOKYO"→"SYDNEY"→• •→"BANGKOK"→"HONGKONG"→"TOKYO". On the other hand, upon depression of the "−" key, the displayed place name changes in the order of "TOKYO"→"HONGKONG"→"BANGKOK"→• •→"SYDNEY"→"TOKYO".

When "TOKYO" is displayed on the screen area 50d, the user depresses the "MENU" key 40 again to determine "TOKYO" as a place to be set, and "TIME ZONE" of the internal time of the main unit changes to "TOKYO".

However, as described above, when the menu is displayed on the display screen to change the setting state of the functions of the main device, since the "MENU" key 40, the "NEXT" key 41, and one of the "+" and "−" keys must be operated, the user must operate at least three manual switches in this case. For this reason, the conventional operation for changing the setting of functions is very troublesome.

In view of this problem, in recent years, an electronic device such as a video camera which has an electronic viewfinder for displaying a plurality of functions on a monitor screen and a gazing point or line of sight detection device for detecting the gazing point of the operator on the monitor screen has been proposed.

In such video camera, when an operator gazes at a function index displayed in the monitor screen, a gazing point is detected, the function desired by the user is determined on the basis of the detected gazing point, and the function corresponding to the function index corresponding to the gazing point is executed. Execution of a function based on line of sight detection, i.e., selection of a function based on line of sight detection will be generally referred to as an "eye switch" hereinafter.

An example of the eye switch will be explained below with reference to FIG. 2.

A video camera shown in FIG. 2 has nine functions "WIND CUT" to "EYE SWITCH". Upon depression of a "MENU" key 40, the names of these nine functions are displayed on a screen area 50e in an electronic viewfinder 50. An operator moves a cursor 51 to the position of "EYE SWITCH" on a screen area 50f in the viewfinder 50 using a "NEXT" key 41. The "EYE SWITCH" function further includes four functions displayed as "FADE" (a function of fading out an image), "DATE" (a mode of inputting a date), "TITLE" (a mode of inputting a title), and "⤺" (a mode of rewinding and reproducing a partially recorded portion). In an example shown in FIG. 2, "FADE" was selected in the previous setting operation.

When the user wants to select the function "⤺", he or she depresses one of "ADVANCE" keys 42. For example, upon depression of the "+" key 42, the mode included in the "EYE SWITCH" function changes, on a display screen area 50h, in the order of "FADE"→"DATE"→"TITLE"→

→"OFF"→"FADE"• • •.

"⤺" the other hand, upon depression of the "−" key 42, the mode changes in the order of "FADE"→"OFF"→

→"TITLE"→"DATE"→"FADE"• • • When the user depresses the "MENU" key 40 again as "⤺" is displayed, the video camera determines that the user has selected the "⤺" mode, turns off the menu displayed in the viewfinder 50, and displays a "⤺" mark 52 in the viewfinder 50 instead.

At this time, the "⤺" function is not executed. In order to execute this function, the user gazes the "⤺" mark 52. The line of sight detection device arranged in this video camera detects that the line of sight of the user matches the mark 52, and starts execution of the "⤺" mode.

In the above-mentioned prior art, to change the function of the main device using the function setting apparatus, a plurality of menu screens or pages are required, and many key operations are required to change the menu screen or page, resulting in a very cumbersome function changing operation in the conventional apparatus.

In the conventional function setting apparatus, only one name is displayed on the menu page screen provided with the eye switch. For this reason, the operator cannot simultaneously confirm the setting contents for all the functions of the electronic device main body.

SUMMARY OF THE INVENTION

The present invention has been made to solve the conventional problems and has as its object to provide a function setting apparatus for selecting one of a plurality of functions of an electronic device, and setting the selected function to be executed by the electronic device, comprising:

upper-level eye-controlled menu display means for displaying a plurality of upper-level function menu items on a predetermined display screen so that an arbitrary one of the function menu items can be designated by a line of sight of an operator; and lower-level eye-controlled menu display means for, when the line of sight of an operator is detected in correspondence with one of the plurality of upper-level function menu items displayed by the upper-level eye-controlled menu display means, displaying at least one lower-level function menu item associated with the detected one upper-level function menu item on the display screen, whereby an arbitrary one of the function items can be designated by the line of sight.

With this apparatus, an operator can continuously select a target menu item or function from the upper-level eye-controlled menu to the lower-level eye-controlled menu, and the present invention can provide an excellent user interface.

According to one preferred aspect of the present invention, one upper-level function menu item includes a function type name which summarizes a plurality of lower-level function menu items corresponding to the function menu item. Therefore, the operator can quickly find an upper-level function menu item that includes a target lower-level function.

According to one preferred aspect of the present invention, at least one middle-level function menu item, which are located between upper- and lower-level function menu items, are displayed. Even when the conceptual difference between the upper- and lower-level menus is large, the operator can quickly find a target function menu item.

According to one preferred aspect of the present invention, the selected menu item and non-selected menu items are displayed, so that the operator can identify them.

According to one preferred aspect of the present invention, the lower-level eye-controlled menu display means comprises:

means for detecting that an arbitrary second upper-level function menu item other than the first upper-level function menu displayed on the page is selected by the line of sight; and means for displaying the second upper-level function menu item to be identifiable from other upper-level function menu item, and displaying lower-level function menu items corresponding to the second upper-level function menu item.

With this arrangement, when a lower-level menu of a certain upper-level menu is displayed, the operator can quickly select another upper-level menu.

According to one preferred aspect of the present invention, the apparatus further comprises a first manual operation switch for setting the setting apparatus in a mode in which the upper- and lower-level eye-controlled menu display means are enabled. With this arrangement, it is easy to discriminate whether the display means is set in the normal mode or the eye-controlled input mode in terms of user's operation.

According to one preferred aspect of the present invention, since the uppermost-level menu is selected via a manual switch, the uppermost-level menu selection operation can be reliably performed.

In order to achieve the above object, according to the present invention, there is provided a user interface method for an electronic device, comprising the steps of:

displaying a plurality of upper-level function menu items on a predetermined display screen so as to be designated by a line of sight;

specifying one of the plurality of displayed upper-level function items, which matches the line of sight of an operator; and displaying at least one lower-level function menu item associated with the specified upper-level function menu item on the display screen so as to be designated by the line of sight.

According to one preferred aspect of the present invention, contents of each of the upper-level function menu items include a general idea of the lower function menu items.

According to one preferred aspect of the present invention, when one of the lower-level function menu items is selected by the line of sight, a function assigned to the selected lower-level function menu item is executed.

According to one preferred aspect of the present invention, an upper-level function menu item and lower-level function menu items corresponding to the upper-level function menu item are displayed on an identical page screen.

According to one preferred aspect of the present invention, an upper-level function menu item and lower-level function menu items corresponding to the upper-level function menu item are displayed on different page screens.

It is another object of the present invention to provide an electronic device which can selectively switch a plurality of upper-level functions, comprising:

display means for identifiably displaying names of the plurality of upper-level functions;

selection means for causing an operator to select a one target upper-level function from the displayed upper-level functions;

means for executing the selected one function; and a sole switch for performing a manual operation for changing the selection of one of the plurality of upper-level functions.

According to one preferred aspect of the present invention, the display means displays the names of the upper-level functions on different page screens, and the page screen changes when the selection of the upper-level function is changed by the switch.

According to one preferred aspect of the present invention, when the sole switch is operated while the electronic device is performing a predetermined operation, the electronic device is set in a mode for enabling the display means.

According to one preferred aspect of the present invention, the selection means comprises:

means for measuring an operation time of the switch by the operator; and means for changing the selection of the upper-level function menu items selected in turn in accordance with the operation time. With this arrangement, since the function is switched depending on the time duration, the number of switches can be reduced to one.

According to one preferred aspect of the present invention, the device further comprises:

means for, when one of the upper-level function menu items displayed by the display means is selected, detecting if a display position of the selected one upper-level function menu item coincides with a gazing position of the operator; and means for displaying lower-level function menu items corresponding to the selected one upper-level function menu item upon detection of the coincidence. The upper- and lower-level menus can be continuously switched.

According to one preferred aspect of the present invention, display areas of the names of the plurality of upper-level function menu items are assigned to different page screens, and each of the page screens has a link display area for displaying a link to a next page.

According to one preferred aspect of the present invention, one of the display areas of the names of the plurality of upper-level function menu items or the link display area is designated by a pointing device.

According to one preferred aspect of the present invention, one of the display areas of the names of the plurality of upper-level function menu items or the link display area is designated by the line of sight of the operator.

According to one preferred aspect of the present invention, a window time required when one of the display areas of the names of the plurality of upper-level function menu items is designated by the line of sight is longer than a window time required when the link display area is designated by the line of sight.

Since the window time for designating the upper-level function menu item is prolonged, the operation reliability can be improved.

According to one preferred aspect of the present invention, display areas of the names of the plurality of upper-level function menu items are assigned to different page screens, and each of the page screens has a forward link display area for displaying a link to a next page and a backward link display area for displaying a link to a previous page.

The forward or backward jump operation can be desirably performed among pages.

According to one preferred aspect of the present invention, one of the display areas of the names of the plurality of upper-level function menu items or the link display area is designated by the line of sight of the operator.

Other features and advantages of the present invention will be apparent from the following description taken in conjunction with the accompanying drawings, in which like reference characters designate the same or similar parts throughout the figures thereof.

DETAILED DESCRIPTION OF THE INVENTION

The preferred embodiments of a function setting apparatus using line of sight according to the present invention will be described hereinafter with reference to the accompanying drawings. The function setting apparatus of each embodiment is used together with another electronic device, allows a user to select one of a plurality of functions provided to the electronic device, and sets the selected function as a function to be executed by the electronic device.

<First Embodiment>

Figure 1:
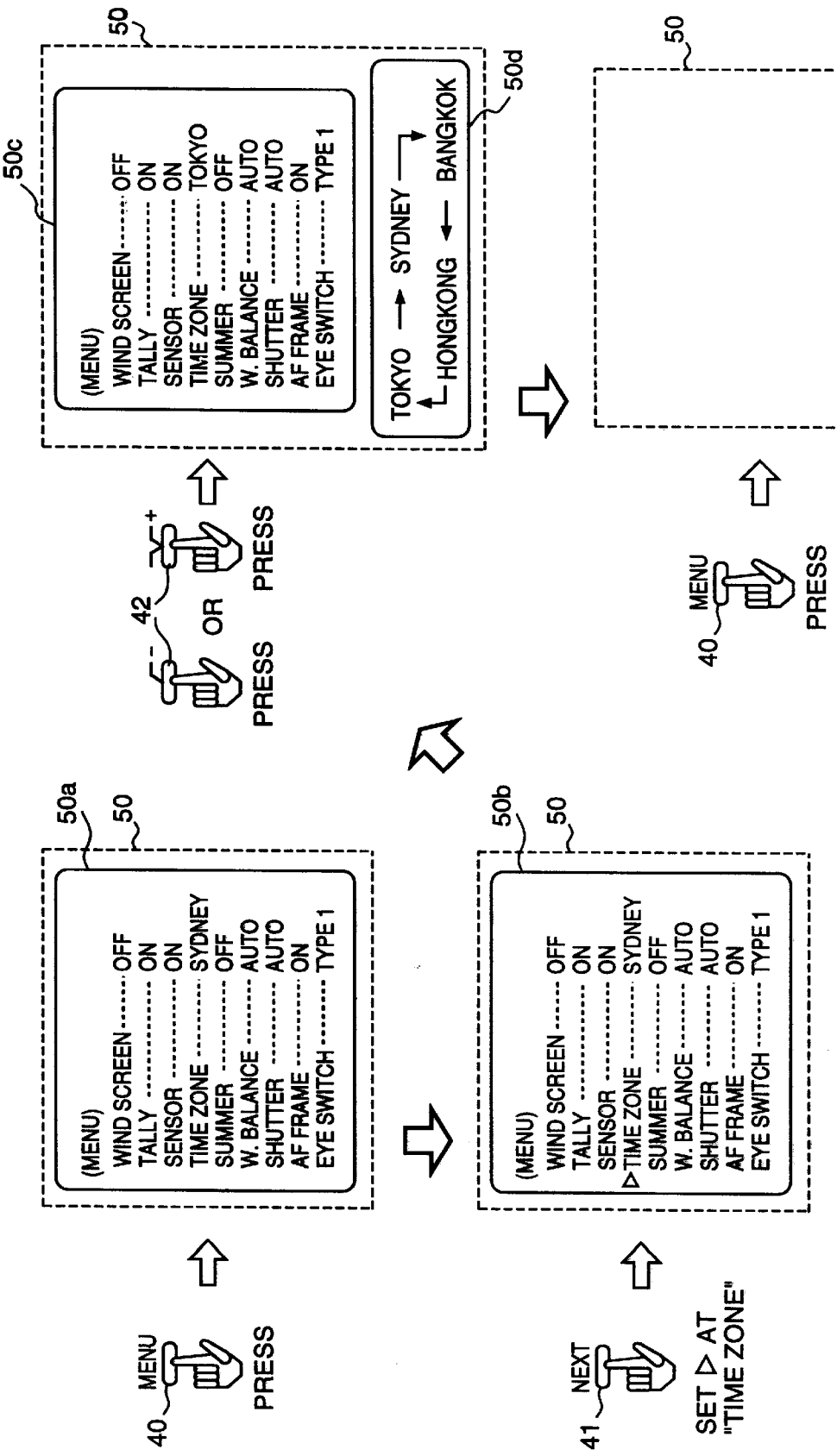
FIG. 1 is an explanatory view showing a conventional function setting procedure without using any eye switch.
Figure 2:
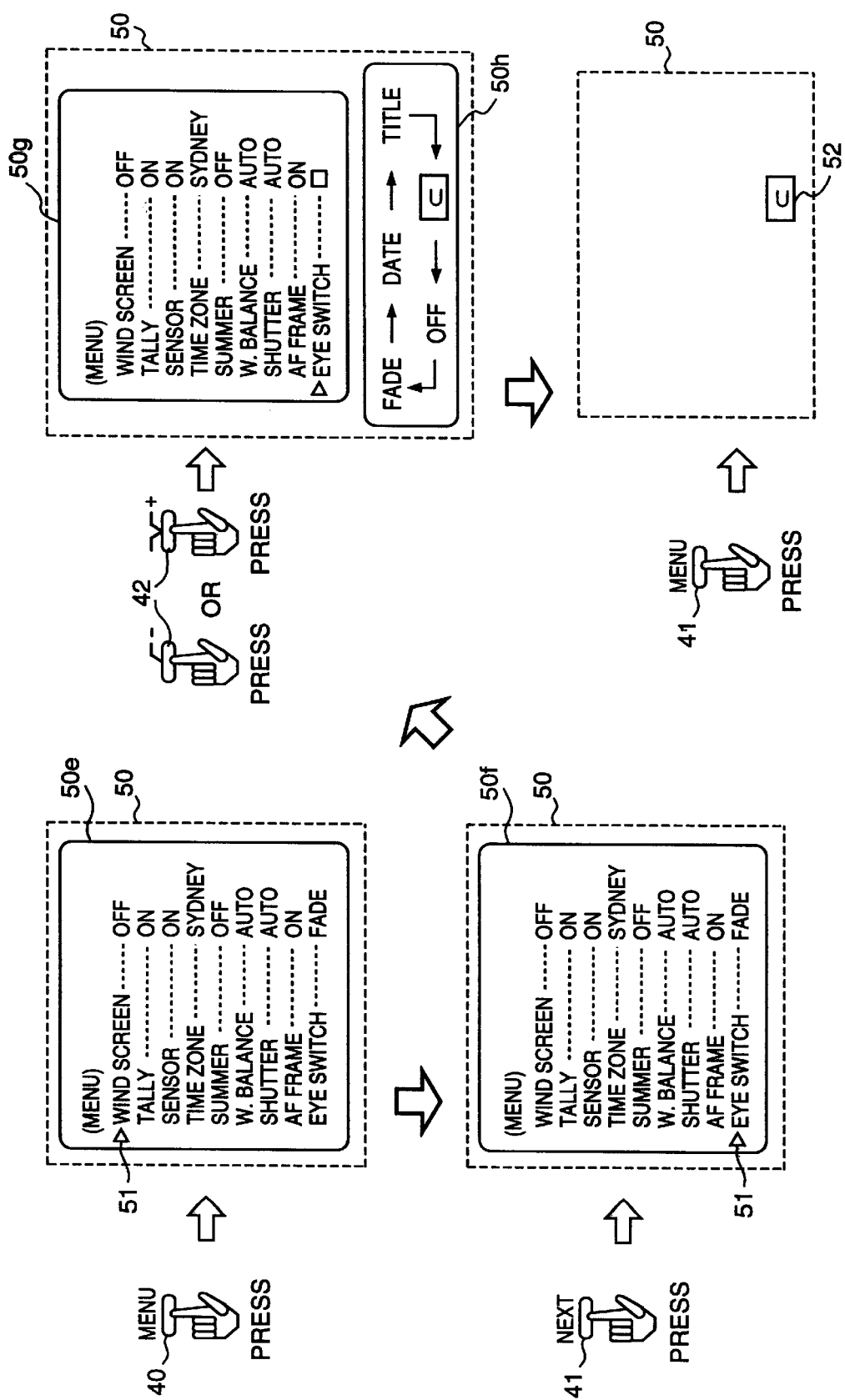
FIG. 2 is an explanatory view showing a conventional function setting procedure using an eye switch.
Figure 3:
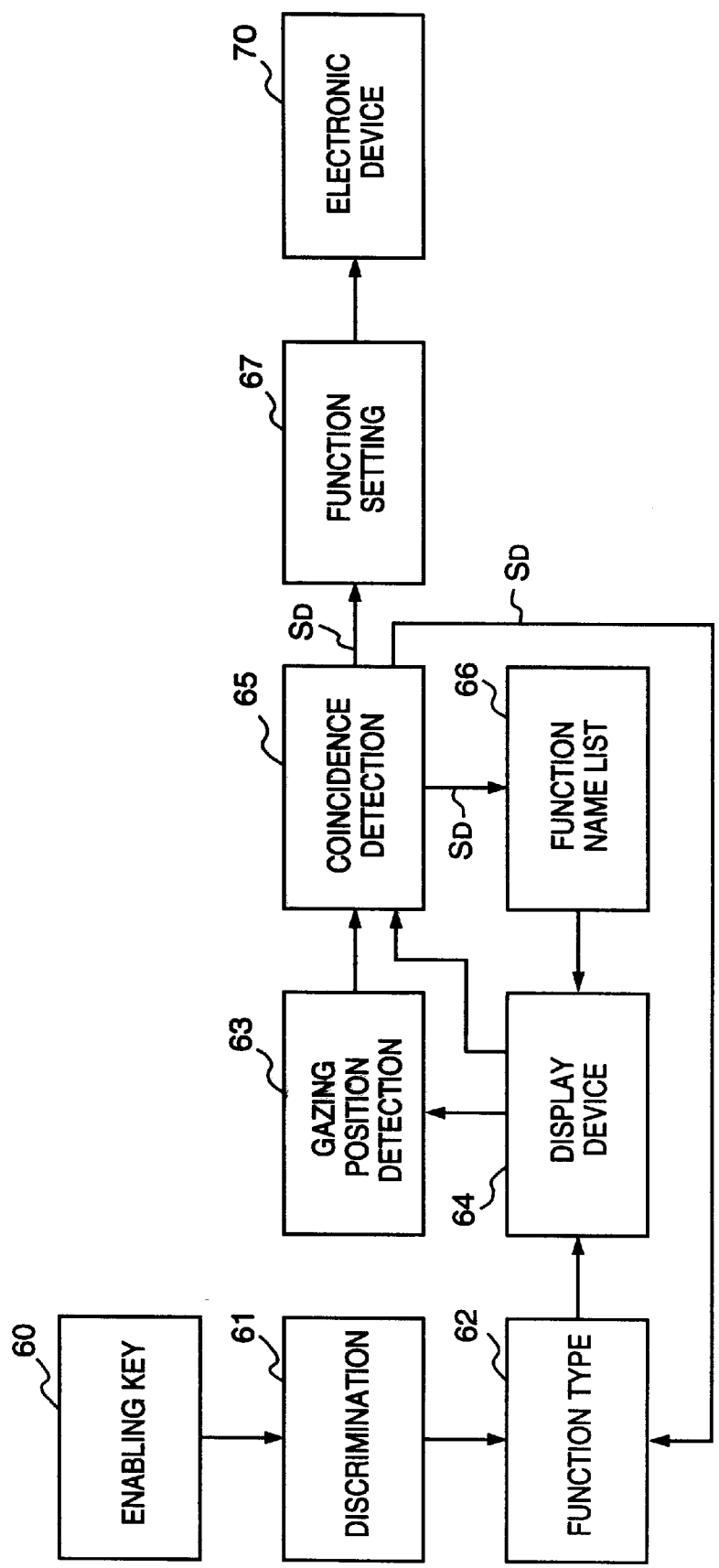
FIG. 3 is a schematic block diagram showing the arrangement of a function setting apparatus using eyes according to the first embodiment of the present invention.

A function setting apparatus using line of sight according to the first embodiment has an eye-controlled-menu enabling switch 60 and a display device 64, as shown in FIG. 3. The apparatus comprises, as functional blocks, a discrimination block 61, a function type display block 62, a gazing position detection block 63, a coincidence detection block 65, a function name list display block 66, and a function setting block 67.

The discrimination block 61 checks if a user who is operating an electronic device 70 has operated the eye-controlled-menu enabling switch 60.

The function type display block 62 controls a display operation on the basis of the discrimination result of the discrimination block 61. When the user operates the eye-controlled-menu enabling switch 60, the display block 62 displays a plurality of "function types" of the electronic device main body 70 on the display screen of the display device 64.

Note that the display device 64 need not always be one exclusively used by the function setting apparatus but may be shared with the electronic device main body 70.

The user can confirm available function types of the electronic device main body 70 as a list displayed on the display device 64.

The gazing position detection block 63 detects the gazing position of the user who is looking at the display screen of the display device 64, by detecting a line of sight of the user.

The coincidence detection block 65 detects a coincidence between the gazing position of the user detected by the gazing position detection block 63 and the display position on the display screen of the display device 64. The detected display position, i.e., the output from the coincidence detection block 65 represents the function type gazed by the user. In other words, the "function type" located at the display position detected based on the output from the coincidence detection block 65 can be determined as the one that the user wants to use.

The function name list display block 66 displays a list of all the function names belonging to the "function type" determined based on the output from the coincidence detection block 65 on the display screen of the display device 64.

The function setting block 67 receives the output from the coincidence detection block 65 as well as the function name list display block 66. More specifically, the output from the coincidence detection block 65 to the function setting block 67 may designate a function that the user wants of those displayed on the display device 64 under the control of the function name list display block 65. Therefore, upon reception of the output from the coincidence detection block 65, the function setting block 67 supplies an identifier of a function that matches the gazing position of the user to the electronic device 70, and the electronic device 70 can detect the function requested by the user.

When the function setting apparatus shown in FIG. 3 is applied to a video camera, the display device 64 corresponds to a viewfinder of the video camera. Most of video cameras (especially, digital video cameras) have many digital functions. When the user looks into the display device 64 (viewfinder), a normal image-sensed frame is displayed there. When the user depresses the eye-controlled-menu enabling switch 60, the depression is detected by the discrimination block 61, and the detection output of the discrimination block 61 is supplied to the function type display block 62. As a result, the function type display block 62 displays the types of various digital functions provided to the video camera on the display screen of the display device 64 (viewfinder).

When the user gazes one of the displayed digital function types, the gazing position detection block 63 detects a gazing position. The detected gazing position information of the user and the position information of the digital function type displayed on the display device 64 are supplied to the coincidence detection block 65. The coincidence detection block 65 checks if the gazing position of the user matches one of the display positions of a plurality of types displayed on the display device 64.

If it is determined as a result of checking that the gazing position of the user matches one of the display positions of the types, the coincidence detection block 65 supplies a coincidence detection signal SD to the function type display block 62. In response to this signal, the function type display block 62 emphasis-displays the matched function type on the display screen of the display device 64, and the display device 64 additionally displays a list of the names of digital functions corresponding to the type under the control of the function name list display block 65.

In this manner, when the user gazes one of the names of the digital functions displayed as a list on the display screen of the display device 64, the gazing position of the user is detected again by the gazing position detection block 63. The coincidence detection block 65 checks again if the detected gazing position of the user matches one of the display positions of the names of the digital functions displayed on the display device 64.

When the coincidence detection block 65 determines a digital function that matches the gazing position of the user, it supplies a coincidence detection signal SD to the function name list display block 65, and the name of the matched digital function is emphasis-displayed. The coincidence detection signal SD is also supplied to the function setting block 67. Upon reception of the coincidence detection signal SD, the function setting block 67 assigns the digital function that matches the gazing position of the user to a function switch of the electronic device main body.

As described above, according to the function setting apparatus using line of sight of this embodiment, the functions of the main device and their setting contents can be displayed as a list on the display screen of the display device 64, and one of the functions can be selected and set based on the line of sight of the user.

Therefore, according to the function setting apparatus using eyes of this embodiment, the setting and changing operations associated with the functions of the main device can be easily and quickly attained. Even when the electronic device main body has many functions, the functions can be displayed while being classified in units of function types.

According to this embodiment, when the user gazes one of the displayed function types or function names, the gazing position detection block 63 detects the gazing position of the user, and the coincidence detection block 65 detects a coincidence between the position and the display position of the function type or name. Therefore, since the user can select a page screen that shows other function types or names by only gazing the function type or name displayed on the display screen, he or she can easily and quickly change the menu selection page screen.

The electronic device to which the present invention can be applied is not limited to the video camera. The present invention can be applied to any other devices that have a menu display function. For example, hierarchical menus are set on the display screen of a personal computer. In this case, the number of layers of the hierarchical menus is not limited to two. For example, a large number of layers may be set like a main menu to a primary sub menu, the primary sub menu to a secondary sub menu, and the secondary sub menu to • • •, so on. Thus, the eye-controlled selection method can be applied to each of these multi-layered menus.

Figure 4:
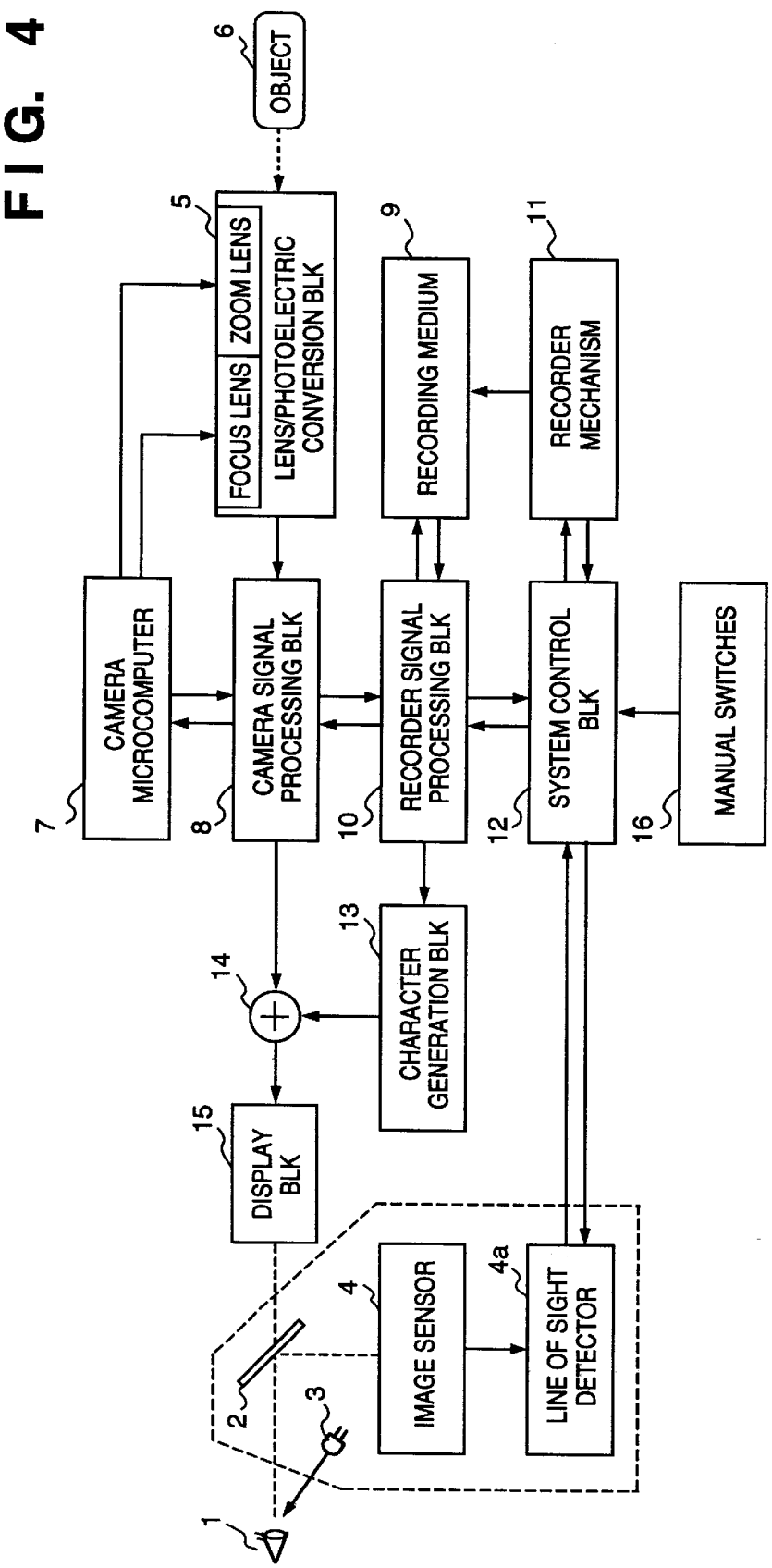
FIG. 4 is a block diagram showing in detail the function setting apparatus using eyes according to the first embodiment.

The detailed arrangement of a function setting apparatus using eyes according to the present invention will be described below on the basis of its embodiment. FIG. 4 is a block diagram showing an embodiment wherein the function setting apparatus using eyes according to the present invention is applied to a camera built-in type VTR.

Referring to FIG. 4, reference numeral 1 denotes an eyeball of a user; 2, a dichroic mirror; 3, an infrared LED; and 4, an image sensor. A line of sight detection circuit 4a detects the line of sight of the user on the basis of an image of the eyeball 1 detected by the sensor 4.

Reference numeral 6 denotes an object. Reference numeral 5 denotes a lens/photoelectric conversion block, which includes a lens optical system and a photoelectric conversion block such as a CCD. Reference numeral 7 denotes a microcomputer for controlling the entire camera; and 8, a signal processing block for generating an image that is displayed on a display block 15 by processing a photo-electrically converted image signal. Reference numeral 9 denotes a storage medium such as a floppy disk, which records an image signal processed by the signal processing block 8 under the control of a recorder signal processing block 10. Reference numeral 11 denotes a recorder mechanism; 12, a system control block; 13, a character generation block; 14, an adder; 15, a display block; and 16, a manual switch group.

The character generation block 13 generates graphic data of characters and symbols of a menu to be displayed on the display block 15.

In the arrangement shown in FIG. 4, infrared rays irradiated from the infrared LED 3 onto the eyeball 1 of the user are reflected by the eyeball 1, and are guided to the dichroic mirror 2. The dichroic mirror 2 has selective transmittance for light components in two colors. That is, the dichroic mirror 2 reflects only light reflected by a predetermined portion of the eyeball, and guides the reflected light toward the image sensor 4. The image sensor 4 is constituted by arranging photoelectric conversion elements in a matrix pattern. The output from the sensor 4 indicates the matrix position, irradiated with light, on the sensor 4, i.e., represents the gazing position. More specifically, since the incident position of infrared rays on the image sensor 4 is determined by the direction of the eyeball 1 of the user, the gazing position of the user on the display block 15 can be detected by detecting the coordinate position on the image sensor 4 using the line of sight detection circuit 4a.

The output from the line of sight detection circuit 4a is supplied to the control block 12. More specifically, the control block 12 can determine the gazing position of the user on the display block 15 via the output from the line of sight detection circuit 4a. On the other hand, the control block 12 recognizes the display positions of various switch icons on the display block 15. Therefore, when the gazing position of the user supplied from the detection circuit 4a matches the display position of one switch icon displayed on the display screen of the display block 15, the control block 12 can specify a switch designated by the user by means of his or her line of sight.

The operation procedure of the function setting apparatus using eyes according to this embodiment will be described in detail below with reference to the accompanying drawings.

Figure 5:
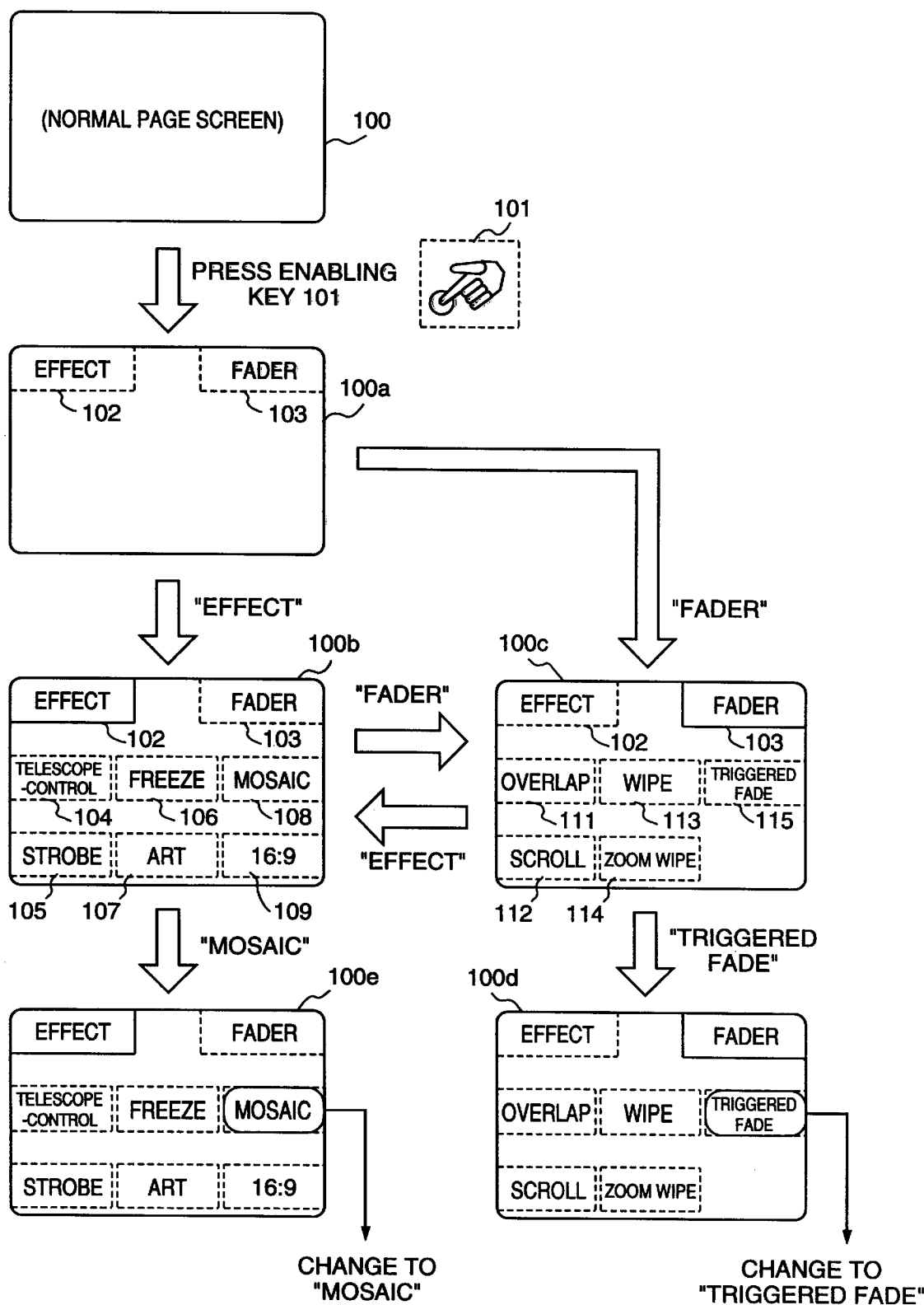
FIG. 5 is a view showing the operation procedure of the first embodiment.

FIG. 5 is an explanatory view for explaining in detail the first embodiment.

Referring to FIG. 5, reference numeral 100 denotes a normal page screen displayed on the display block 15 of the viewfinder. Normally, the page screen 100 displays an image picked up by the lens/photoelectric conversion block 5. When a "MENU" key (not shown) of the manual switches 16 is depressed, a plurality of menu items are displayed on the page screen 100. Characters or symbols of these menu items are generated by the character generation block 13. As described above, when the user depresses or selects the eye-controlled-menu enabling switch 60 (included in the switches 16), the names of menu classes (or menu types) are displayed on a page screen 100a of the display block 15. In an example shown in FIG. 5, as the menu classes (or menu types), "EFFECT" (102) and "FADER" (103) are available. More specifically, the user confirms that the two menu types, i.e., "EFFECT" (102) and "FADER" (103), are available in this camera by looking at the contents displayed on the viewfinder 64.

When the user looks at the item "EFFECT" 102 on the page screen 100a, the page screen 100a is switched to a page screen 100b. On the other hand, when the user looks at the item "FADER" 103, the page screen 100a is switched to a page screen 100c.

On the page screen 100b, "TELESCOPE-CONTROL", "FREEZE", "MOSAIC", "STROBE", "ART", "16:9", and the like are the names of digital functions set in association with the function type "EFFECT". When the function type "EFFECT" is selected, the item "FADER" is displayed in light color on the page screen 100b to indicate that it is not selected.

On the page screen 100c, "OVERLAP", "WIPE", "TRIGGERED FADE", "SCROLL", "ZOOM WIPE", "16:9", and the like are the names of digital functions set in association with the function type "FADER". When the function type "FADER" is selected, the item "EFFECT" is displayed in light color on the page screen 100c to indicate that it is not selected.

When the user looks at "MOSAIC" on the page screen 100b, a page screen 100e is displayed. On the page screen 100e, the item "MOSAIC" is emphasis-displayed to indicate that it is selected. When the system control block 12 detects that "MOSAIC" is selected, it instructs the camera signal processing block 8 to execute mosaic processing.

When the user looks at "TRIGGERED FADE" on the page screen 100c, a page screen 100d is displayed. On the page screen 100d, the item "TRIGGERED FADE" is emphasis-displayed to indicate that it is selected. When the system control block 12 detects that "TRIGGERED FADE" is selected, it instructs the camera signal processing block 8 to execute TRIGGERED FADE processing.

Once the eye-controlled menu mode is selected by the eye-control enabling switch 60 (or 101), this mode is not canceled unless the switch 60 (or 101) is depressed again.

In this manner, once the eye-controlled menu mode is selected, a transition from a main menu (upper-level menu) to a sub menu (lower-level menu), a transition from the sub menu to another sub menu, . . . are attained by looking at a target menu in the current layer.

In this embodiment, a transition between two lower-level menus belonging to different upper-level menus can be attained. This transition will be described in detail below with reference to a case wherein "WIPE" (113) is switched to "TRIGGERED FADE" (115).

When the user looks into the viewfinder, the normal page screen 100 is displayed. When the user depresses an "eye-controlled menu" selection switch 101, the page screen 100a that shows the names of the function types (upper-level menu) is displayed. In this state, when the user looks at the item "FADER" 103, the gazing position of the user is detected by the gazing position detection block 63, and coincidence detection is performed by the coincidence detection block 65. When a coincidence is detected by the coincidence detection block 65, the function type display block 62 emphasis-displays the item "FADER" 103, and the function name list display block 66 additionally displays digital functions corresponding to the "FADER" function. As a result, the menu selection page screen 100c is displayed on the display screen of the viewfinder.

Assume that the item "WIPE" 113 is selected as a function of a digital function execution switch and is emphasis-displayed. In this state, when the user looks at the item "TRIGGERED FADE" 115, the item "TRIGGERED FADE" 115 is emphasis-displayed, as shown in the menu selection page screen 100d, and a "TRIGGERED FADE" function is assigned to a digital function execution switch.

When the user looks at the item "EFFECT" 102 on the page screen 100c, i.e., when the user wants to switch displayed items to those of the "EFFECT" function while the page screen 100c is displayed, and he or she looks at the item "EFFECT" 102, the displayed page screen is switched to the menu selection page screen 100b on which digital functions corresponding to the "EFFECT" function are additionally displayed.

For example, when the user looks at the item "MOSAIC" 110 on the page screen 100b, the item "MOSAIC" 110 is emphasis-displayed, as shown in the menu selection page screen 100e, and the "MOSAIC" effect function is assigned to the digital function execution switch.

Figure 6:
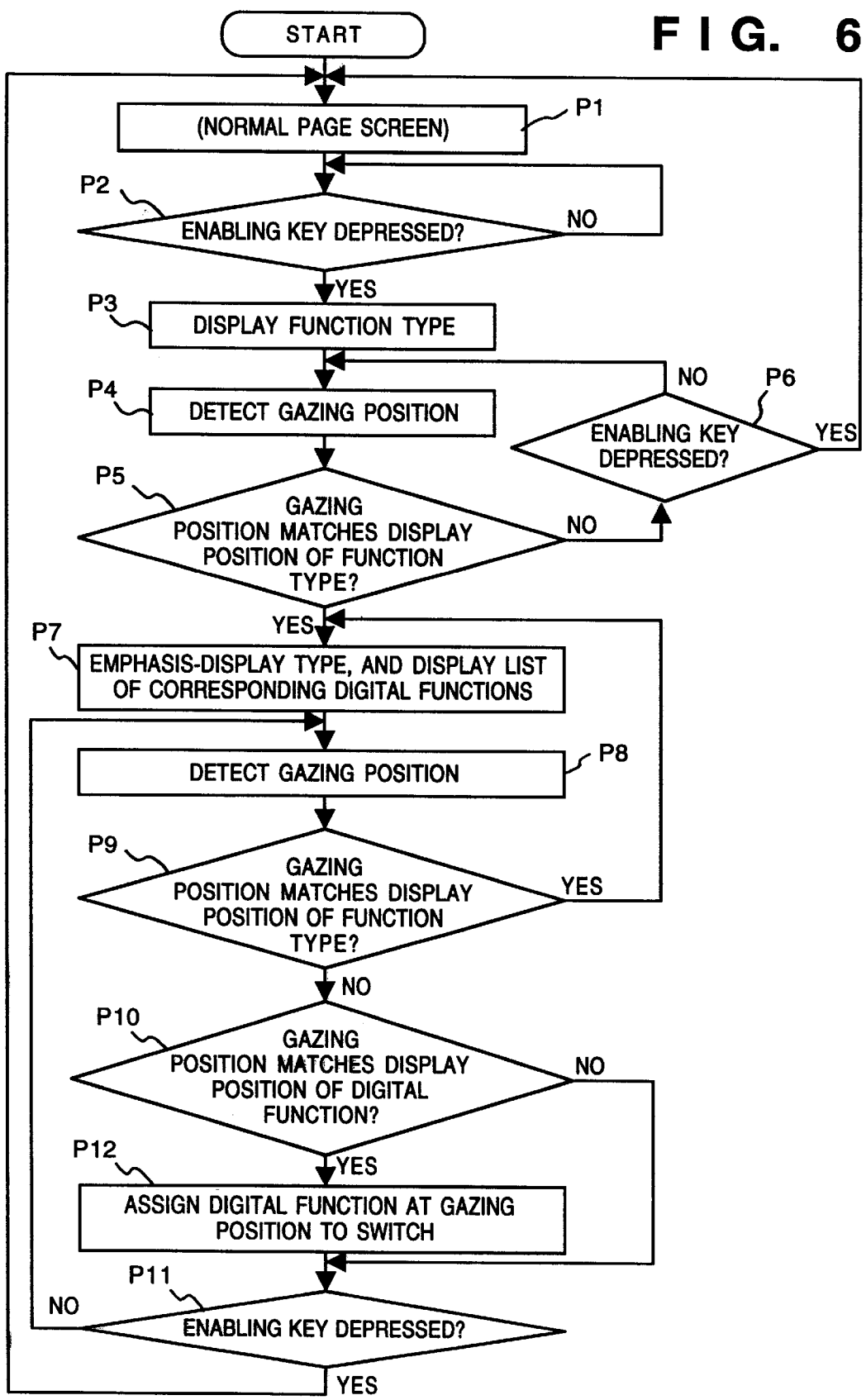
FIG. 6 is a flow chart showing the control sequence of the first embodiment.

The above-mentioned operation will be explained below with reference to the flow chart shown in FIG. 6.

Immediately after the operation is started, when the user looks into the viewfinder, the normal page screen 100 is displayed.

In step P2, it is checked if the "eye-controlled menu" key 101 is depressed. If the user depresses the "eye-controlled menu" key 101, the flow advances to step P3, and the page screen 100a on which the digital function types are displayed is displayed on the viewfinder.

The flow then advances to step P4 and the gazing position of the user is detected by the above-mentioned line of sight detection circuit 4a. It is then checked in step P5 if the detected gazing position of the user matches one of the display positions of the digital function types displayed on the viewfinder.

If it is determined in step P5 that the gazing position of the user matches none of the display positions of the digital function types, the flow advances to step P6 to check if the "eye-controlled menu" key 101 is depressed. If it is determined in step P6 that the "eye-controlled menu" key 101 is not depressed, the flow returns to step P4; otherwise, the flow returns to step P1.

On the other hand, if it is determined in step P5 that the gazing position of the user matches one of the display positions of the types, the flow advances to step P7, and the matched function type is emphasis-displayed, and a list of the names of the corresponding digital functions is displayed.

The flow then advances to step P8 to detect the gazing position of the user. Thereafter, the flow advances to step P9 to check if the gazing position detected in step P8 matches one of the display positions of the names of the digital functions displayed as a list in step P7.

If it is determined in step P9 that the gazing position matches one of the display positions of the digital function names, the flow returns to step P7 to repeat the above-mentioned processing.

On the other hand, if it is determined in step P9 that the gazing position matches none of the display positions of the digital function names, the flow advances to step P10 to check if the gazing position of the user matches one of the display positions of the digital functions.

If it is determined in step P10 that the gazing position matches none of the display positions of the digital functions, the flow advances to step P11 to check if the "eye-controlled menu" key is depressed. If the "eye-controlled menu" key is depressed, the flow returns to step P1; otherwise, the flow returns to step P8 to repeat the above-mentioned operation.

On the other hand, if it is determined in step P10 that the gazing position matches the display position of the digital function, the gazing position matches one of the display positions of the digital functions, the flow advances to step P12, and the function corresponding to the gazing position of the user is assigned to a switch.

<Second Embodiment>

The second embodiment of the operation procedure of a function setting apparatus using eyes according to the present invention will be explained below with reference to FIG. 7.

Figure 7:
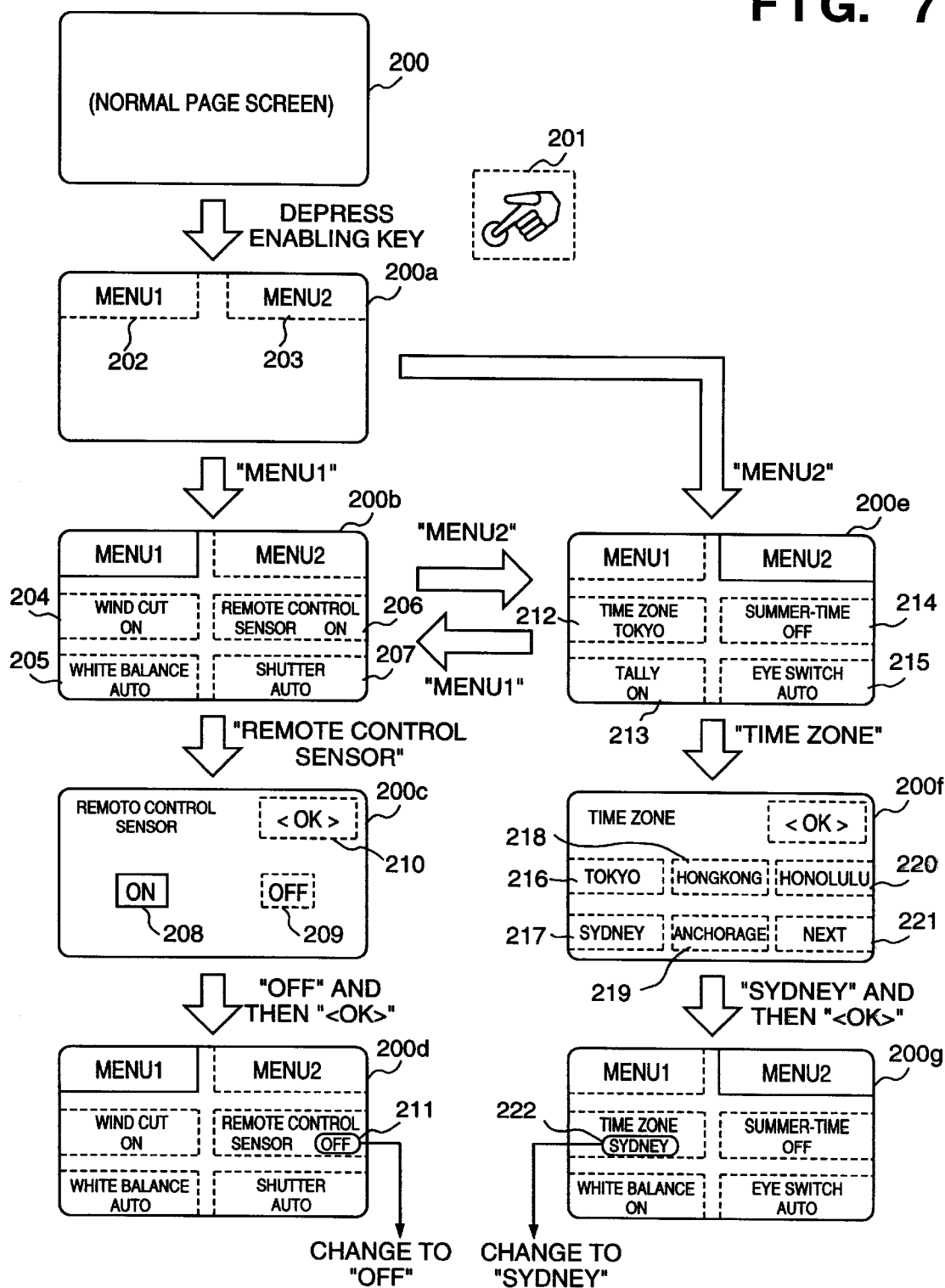
FIG. 7 is a view showing the operation procedure according to the second embodiment of the present invention.

Referring to FIG. 7, reference numeral 200 denotes a normal page screen of a viewfinder; 200a, a page screen of the viewfinder, on which menu class names are displayed; and 202 and 203, areas where the menu class names are displayed.

Furthermore, reference numerals 200b, 200e, 200d, and 200g denote page screens of the viewfinder, on which the menu class names and function names are displayed; and 204 to 207 and 212 to 215, areas where the function names are displayed.

Reference numerals 200c and 200f denote page screens of the viewfinder, on which the names of the setting contents of functions are displayed; 208, 209, and 216 to 221, areas where the names of the setting contents of functions are displayed. Note that these page screens 200a to 200f will be referred to as menu selection page screens hereinafter.

Furthermore, reference numeral 201 denotes a switch having a function of switching the normal page screen to a menu selection page screen or switching a menu selection page screen to the normal page screen. The switch 201 corresponds to an "eye-controlled menu" key arranged on a VTR main body. Reference numeral 210 denotes an "OK" item having a function of determining the setting contents of a function and returning the current page screen to the page screen of the viewfinder on which menu items are displayed.

A case will be explained in detail below wherein a user changes the time zone of the internal timepiece of a camera built-in type VTR from "TOKYO" to "SYDNEY" in the arrangement shown in FIG. 7.

When the user looks at "MENU2" (area 203) while the menu selection page screen 200a on which the menu class names are displayed is displayed, "MENU2" is emphasis-displayed, and menu items corresponding to "MENU2" are additionally displayed (menu selection page screen 200e).

The menu selection page screen 200e includes the display area 202 of the item "TIME ZONE—TOKYO". When the user gazes the area 212 of the item "TIME ZONE—TOKYO", items "TOKYO" (area 216), "SYDNEY" (area 217), "HONGKONG" (area 218), "ANCHORAGE" (area 219), "HONOLULU" (area 220), and "NEXT" (area 221) (menu selection page screen 200f) of the zone setting contents associated with a time function are displayed.

In this state, for example, when the user gazes the item "SYDNEY" 217, "SYDNEY" is selected and emphasis-displayed as the time zone of the internal timepiece of the camera built-in type VTR. Thereafter, when the user gazes the item "OK" (area 200f), "SYDNEY" is determined, and the menu selection page screen 200g is displayed.

In this case, since the contents of the item "TIME ZONE—TOKYO" (area 212) change to "TIME ZONE—SYDNEY" (area 222), the user can confirm that the time zone has changed to that of "SYDNEY".

When the user wants to display items of "MENU1" while the menu selection page screen 200e is displayed, he or she can gaze the item "MENU1" to display the menu selection page screen 200b (on which digital functions are additionally displayed) corresponding to "MENU1".

For example, when the user looks at an item "REMOTE CONTROL SENSOR ON" (area 206) on the menu selection page screen 200b, the menu selection page screen 200c on which items "<OK>" (area 210), "ON" (area 208), and "OFF" (area 209) are displayed as a list is displayed.

When the user looks at the item "OFF" (area 209) and then looks at "<OK>" (area 210), the "REMOTE CONTROL SENSOR" function changes from "ON" state to "OFF" state, as shown in the page screen 200d.

<Third Embodiment>

Figure 8:
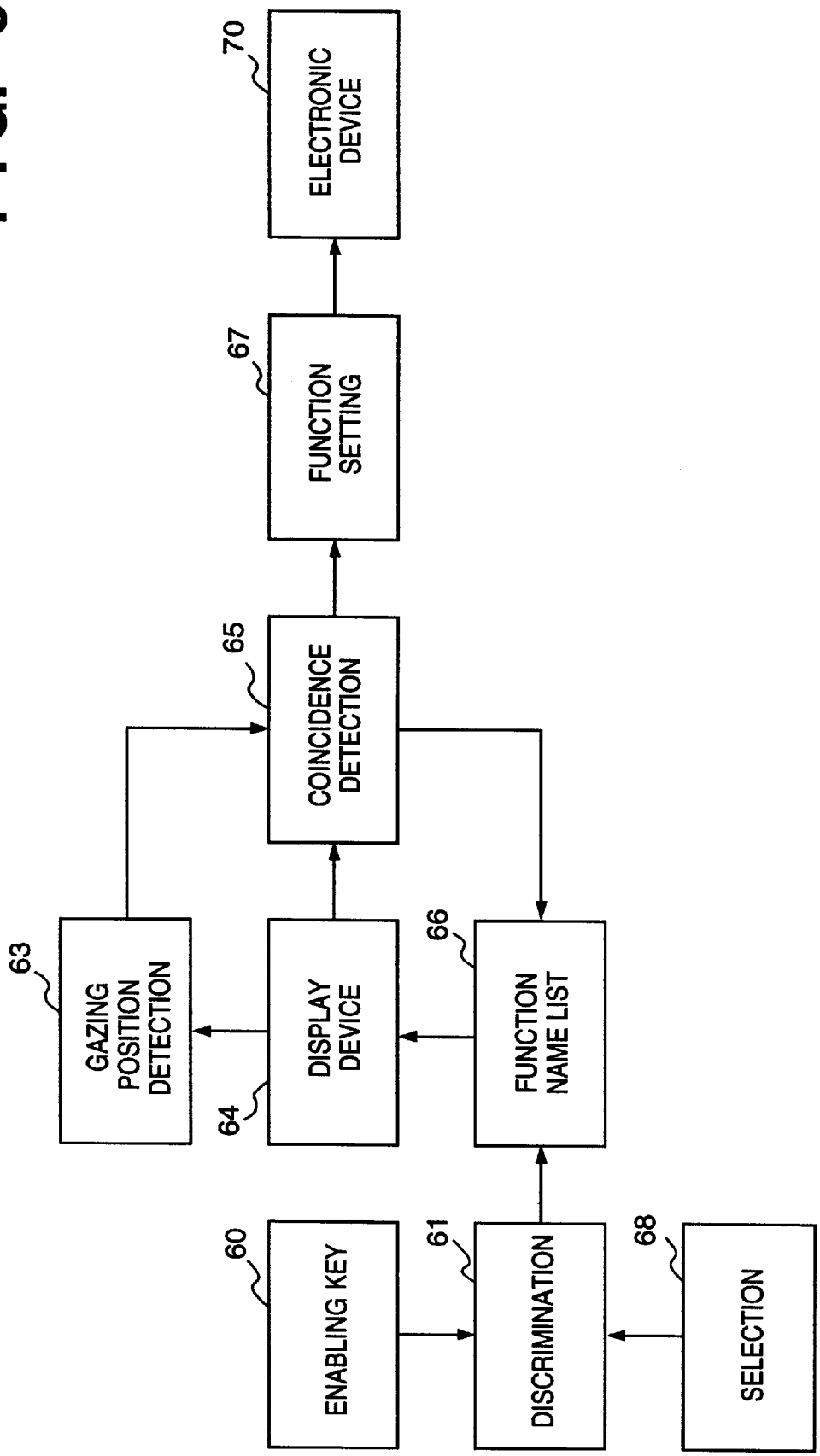
FIG. 8 is a block diagram showing a function setting apparatus according to the third embodiment of the present invention.

A function setting apparatus using eyes according to the third embodiment will be described below with reference to the block diagram in FIG. 8.

In the third embodiment, the apparatus comprises a discrimination block 61, a gazing position detection block 63, a coincidence detection block 65, a function name list display block 66, a function setting block 67, a display device 64, and a selection block 68.

The arrangement of the discrimination block 61 to the display device 64 is the same as that in the first embodiment described above with reference to FIG. 3, and the selection block 68 is arranged for selecting one of a plurality of functions.

The operation of the third embodiment with the above arrangement will be described below with reference to FIG. 9.

Figure 9:
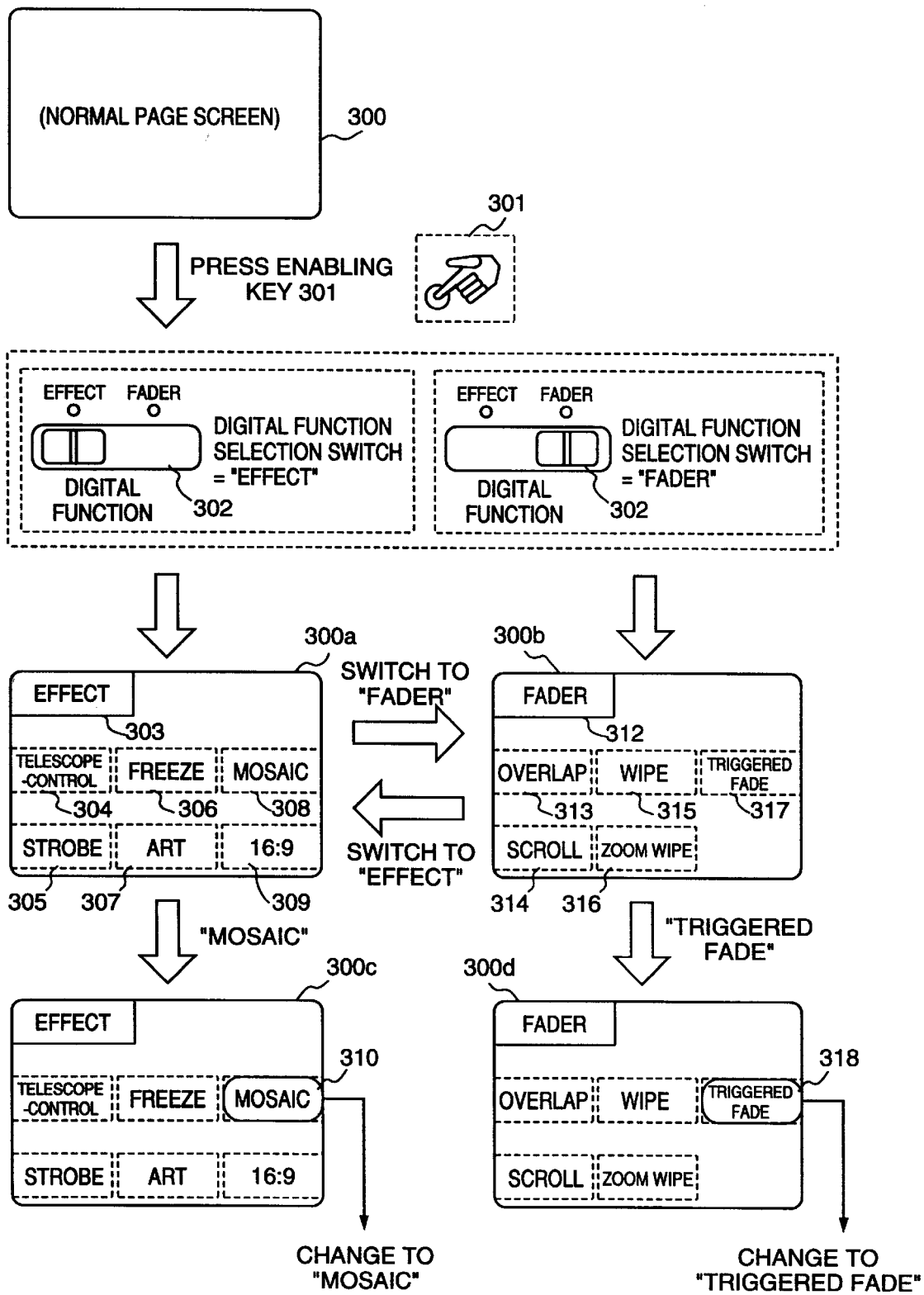
FIG. 9 is a view showing the operation procedure according to the third embodiment.

Referring to FIG. 9, reference numeral 300 denotes a normal page screen of a viewfinder; 300a and 300b, page screens of the viewfinder, on which the class names of digital functions and the names of the digital functions are displayed; 303 and 312, areas where the class names of the digital functions are displayed. Reference numerals 304 to 310 and 313 to 318 denote areas where the names of the digital functions are displayed. Note that the page screens 300a and 300b will be referred to as menu selection page screens hereinafter.

Reference numeral 301 denotes a switch having a function of switching the normal page screen 300 to the menu selection page screen 300a or 300b or switching the menu selection page screen 300a or 300b to the normal page screen 300. The switch 301 is an "eye-controlled menu" key (corresponding to a key 60 in FIG. 8) arranged on a VTR main body. On the VTR main body, a switch (not shown) for executing a digital function is also arranged. Reference numeral 302 in FIG. 9 denotes a "digital function" selection switch having a function of switching the class names of the digital functions. The switch 302 constitutes the selection block 68 in FIG. 8. In this embodiment, two function classes, "EFFECT" and "FADER", are available. Furthermore, the class "EFFECT" includes functions "TELESCOPE CONTROL", "FREEZE", "MOSAIC", "STROBE", "ART", and "16:9", and the class "FADER" includes functions "OVERLAP", "WIPE", "TRIGGERED FADE", "SCROLL", and "ZOOM WIDE".

A case will be explained in detail below wherein the user switches a function assigned to the digital function execution switch 302 from "STROBE" to "MOSAIC".

When the user looks into the viewfinder, the normal page screen 300 is displayed. In this state, when the user depresses the "eye-controlled menu" key 301, one of the "EFFECT" page screen 300a and "FADER" page screen 300b is displayed on the viewfinder in correspondence with the switching state of the "digital function" selection switch 302.

In this case, since the item "MOSAIC" is included in the class "EFFECT" (area 303), the "EFFECT" page screen 300a is displayed. When the "FADER" page screen 300b is displayed since the above-mentioned "digital function" selection switch 302 is set at the "FADER" position, the user can display the "EFFECT" page screen 300a on the viewfinder by switching the "digital function" selection switch 302 to the "EFFECT" position side.

When the "EFFECT" page screen 300a is displayed, one of the digital functions "TELESCOPE CONTROL" (area 304), "STROBE" (area 305), "FREEZE" (area 306), "ART" (area 307), "MOSAIC" (area 308), and "16:9" (area 309) can be selected.

In the case of the "EFFECT" page screen 300a shown in FIG. 9, the currently assigned digital function "STROBE" (area 305) is emphasis-displayed. In this state, for example, when the user looks at the display area 308 of the item "MOSAIC", the item "MOSAIC" (area 308) is emphasis-displayed, as shown in an "EFFECT" page screen 300c, and the "MOSAIC" digital function is assigned to the digital function execution switch (not shown).

On the other hand, when the user wants to select the digital function included in the "FADER" class (area 312) while the "EFFECT" page screen 300a is displayed on the viewfinder, he or she switches the "digital function" selection switch 302 to the "FADER" position side to display the "FADER" page screen 300b on the viewfinder. When the "FADER" page screen 300b is displayed, one of the digital functions "OVERLAP" (area 313), "SCROLL" (area 314), "WIPE" (area 315), "ZOOM WIPE" (area 316), and "TRIGGERED FADE" (area 317) can be selected.

In this case, the currently assigned digital function "WIPE" (area 315) is emphasis-displayed. When, for example, the user looks at the display area 317 of the item "TRIGGERED FADE", the item "TRIGGERED FADE" is emphasis-displayed, as shown in a "FADER" page screen 300d, and the "TRIGGERED FADE" digital function is assigned to the digital function execution switch.

<Fourth Embodiment>

Figure 10A:
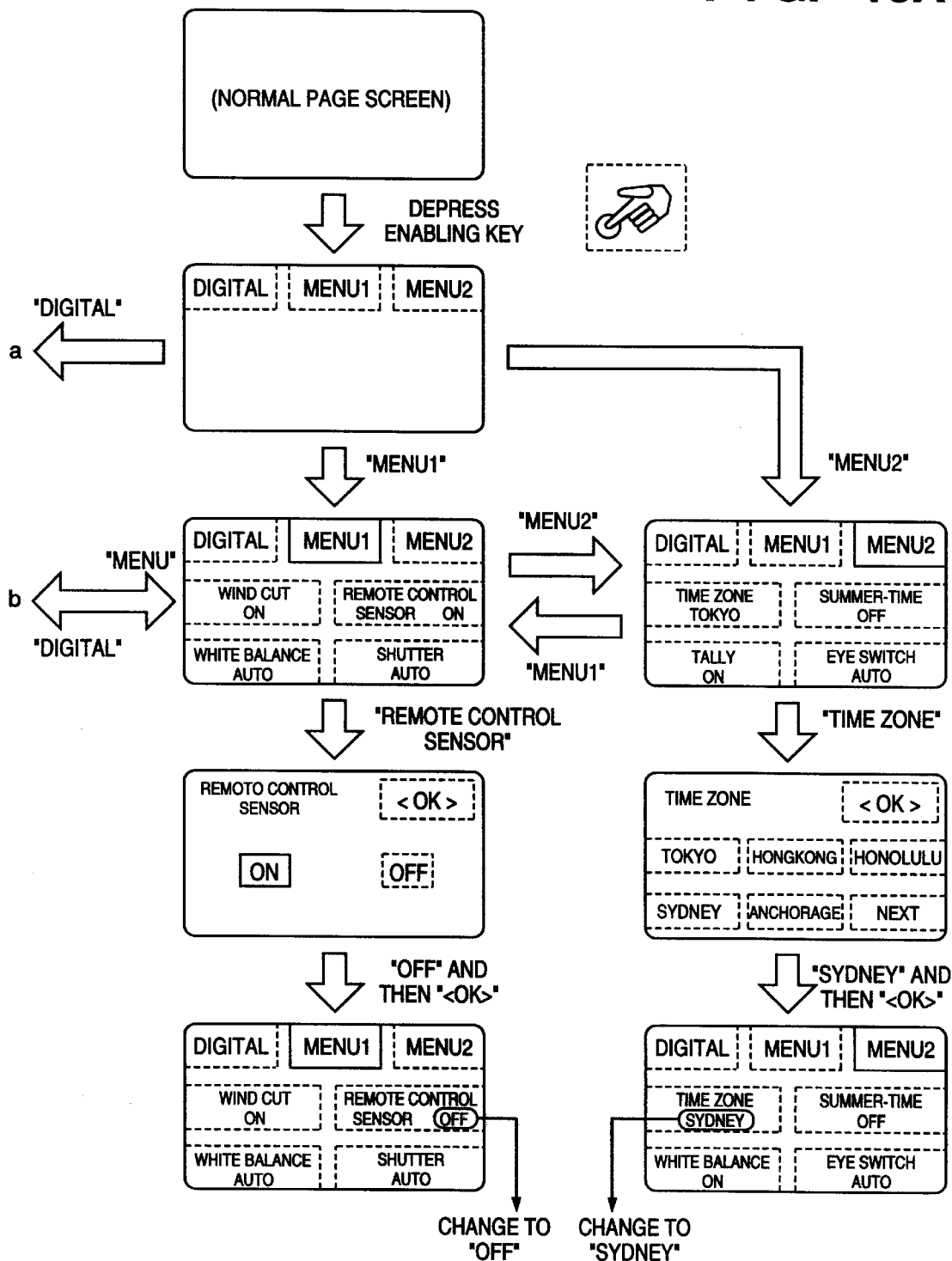
FIG. 10A-B are views showing the operation procedure according to the fourth embodiment of the present invention.
Figure 10B:
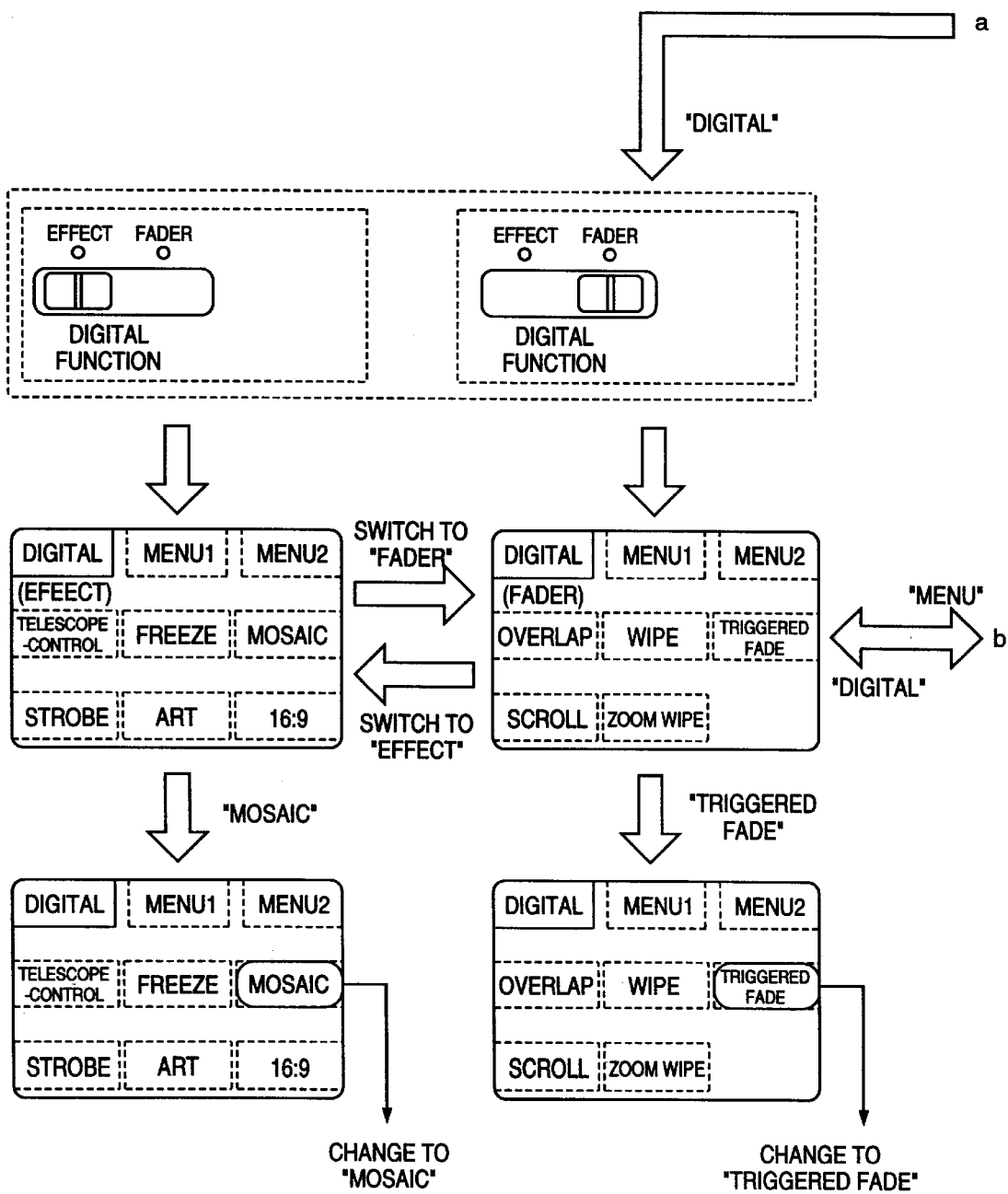

The fourth embodiment allows to execute both the selection procedures of the second and third embodiments, and FIG. 10 shows its procedure. The selection procedure in this case is the same as that described above, and a detailed description thereof will be omitted.

The first to fourth embodiments relate to the eye-controlled switches on the menu display page screens. The function of the eye-controlled switches requires many steps until a target eye-controlled switch is enabled, resulting in a troublesome operations.

The fifth embodiment to be described below is made to solve this problem, and can shortcut the procedure for enabling the function of the target eye-controlled switch using only one selection switch. In other words, in the fifth embodiment, a target eye-controlled function is selected depending on the number of depressions of one selection switch. On the other hand, in the sixth embodiment, a target eye-controlled switch is selected depending on the duration of the depression of one selection switch.

<Fifth Embodiment>

Figure 11:
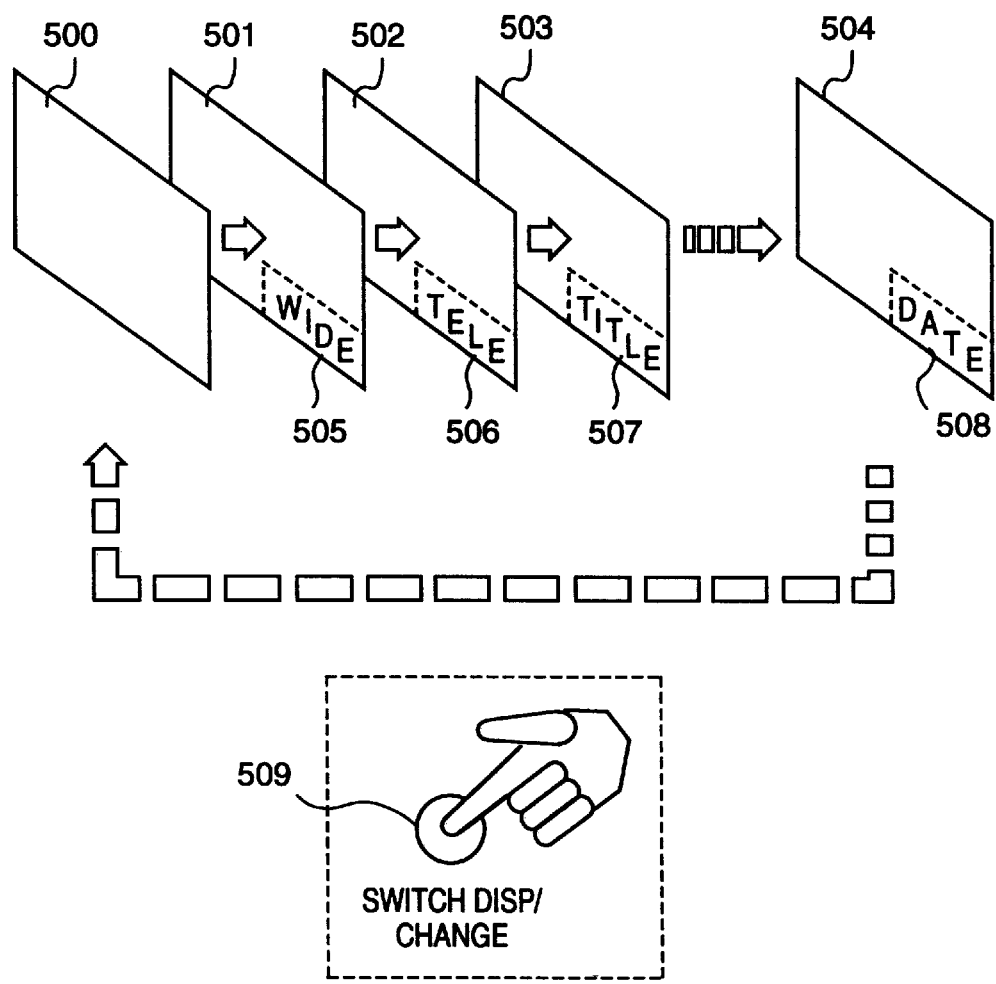
FIG. 11 is a view showing the display state on the screen of a viewfinder according to the fifth embodiment of the present invention.

FIG. 11 is an explanatory view showing the display state and a selection switch of a viewfinder of the fifth embodiment according to the present invention.

Reference numerals 500 to 504 denote page screens of the viewfinder. Of these page screens, the page screens 501 to 504 display switch functions. Reference numerals 505 to 508 denote switch functions displayed on the page screens 501 to 504. Reference numeral 509 denotes a switch named "SWITCH DISP/CHANGE" arranged on a VTR main body. The switch 509 has a function of changing the display states of the switch functions.

The switch function "TITLE" 507 serves as a switch having a function of printing a title created in advance onto an image to be recorded. A case will be explained below wherein an operator requests this "TITLE" function.

When the operator looks into the viewfinder, the page screen 500 on which no switch function is displayed is displayed. In this state, when the operator keeps depressing the switch 509, the page screen 501 is displayed one second later. The switch function 505 displayed on this page screen 501 is "WIDE", which has a function of moving the lens of the VTR to the wide-angle side. The operator who wants to select the title print function further keeps depressing the switch 509. Then, the page screen displayed on the viewfinder changes to the page screen 502 one second later. The switch function 506 displayed on this page screen 502 is "TELESCOPE" having a function of moving the lens to the telephoto or telescope side, and the operator further keeps depressing the switch 509.

One second later, the display state changes again, and the page screen displayed on the viewfinder changes to the page screen 503. On this page screen, the switch function "TITLE" 507 that can execute the title print function is displayed.

As described above, according to the fifth embodiment, even when the eye-controlled switches have a hierarchical structure, the operator can reach a target eye-controlled switch by operating only one switch (physical switch), especially, depending on the number of depressions of the switch.

Note that an execution key may be arranged on the VTR main body of the fifth embodiment, and a switch selection mechanism that executes an eye-controlled switch function upon depression of the execution key by the operator may also be available.

In the fifth embodiment, a plurality of (x) switch functions are displayed. When the switch 509 is depressed on the page screen 504 on which the x-th switch function is displayed, the page screen displayed on the viewfinder returns from the page screen 504 to the page screen 501.

As described above, when the operator operates the switch 509 while looking at the page screen displayed on the viewfinder, he or she can select and switch many functions of the camera built-in type VTR.

<Sixth Embodiment>

The second embodiment as a switch selection mechanism in a camera built-in type VTR having a gazing position detection block will be described in detail below.

Figure 12:
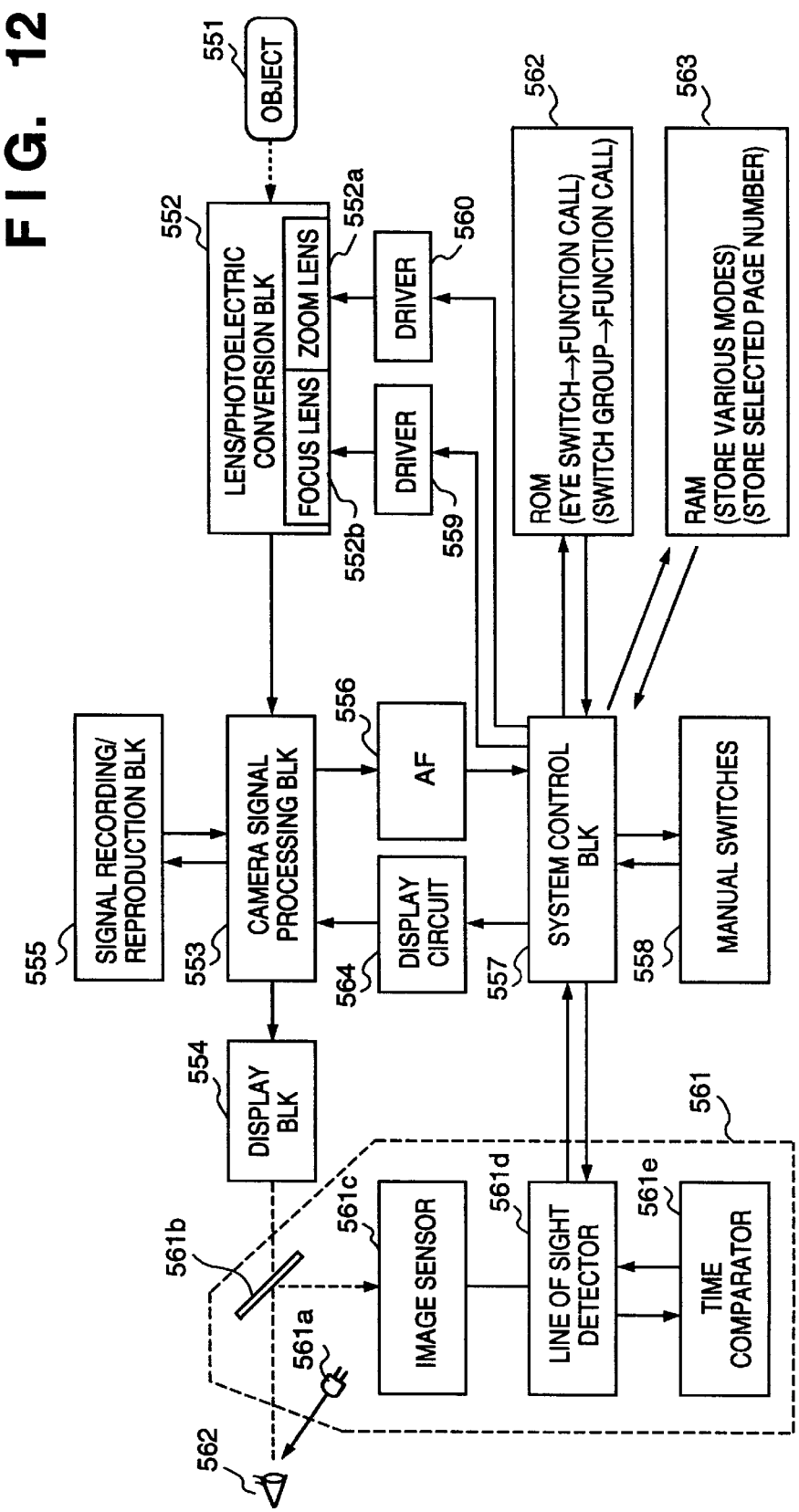
FIG. 12 is a block diagram showing the arrangement of a camera built-in type VTR according to the fifth and sixth embodiments of the present invention.

FIG. 12 is a block diagram showing the arrangement of a camera built-in type VTR common to the fifth and sixth embodiments.

Referring to FIG. 12, an image pickup block (lens/photoelectric conversion block) 552 comprises a zoom lens 552a, a focus lens 552b, and a photoelectric conversion block including an image pickup element such as a CCD for photo-electrically converting an object image formed by these lenses and outputting an image pickup signal. An image of an object 551 is picked up by the image pickup block 552, the object image is converted into an image pickup signal, and the signal is output.

The image pickup signal output from the image pickup block 552 is converted into a standardized video signal by a camera signal processing block 553, and the converted video signal is monitored by a display block 554 comprising, e.g., an electronic viewfinder. The video signal is also supplied to a signal recording/reproduction block 555 comprising, e.g., a VTR, and is recorded on a recording medium such as a magnetic tape.

When the signal recording/reproduction block 555 reproduces a recorded video signal from, e.g., a magnetic tape, the reproduced image can be reproduced and monitored on the display block 554 via the camera signal processing block 553.

The camera signal processing block 553 separates some signal components from the image pickup signal supplied from the image pickup block 552, and supplies them to a focus detection circuit (AF circuit) 556. The circuit 556 detects, e.g., a high-frequency component, which changes in correspondence with the focusing state, in the image pickup signal using a predetermined filter as a focus evaluation value at field periods.

The focus evaluation value detected by the AF circuit 556 is supplied to a system control block 557 which systematically controls the entire video camera system. The system control block 557 controls a driver 559 to drive the focus lens 552b so as to maximize the focus evaluation value detected at the field periods, thus performing an automatic focus adjustment operation.

The control system block 557 is connected to a manual switch group 558 including various operation switches. The system control block 557 recognizes the operation of each of these manual switches and performs control and execution of a corresponding one of various functions.

The manual switches 558 includes a zoom switch. When the zoom switch is operated to the telephoto side or wide-angle side, the system control block 557 controls a driver 560 to drive the zoom lens in accordance with the operation.

The eye-controlled switches of the fifth and sixth embodiments will be explained below. The eye-controlled switches are displayed as indices corresponding to various executable functions on the monitor display screen of the display block 554 in advance, and when an operator gazes one of these indices, a function corresponding to the index is selected.

Reference numeral 561 denotes a line of sight detection block for detecting the gazing point of the operator on the monitor display screen of the display block 554.

An eyeball 562 of the operator who is observing the monitor display screen of the display block 554 is illuminated with light emitted by an infrared LED (IRED) 561a, and the obtained eyeball image is reflected by a dichroic mirror 561b which transmits visible light and reflects infrared rays, so as to be formed on an image sensor 561c.

The eyeball image formed on the image sensor 561c is photo-electrically converted, and the converted signal is supplied to a line of sight detection circuit 561d. The line of sight detection circuit 561d calculates the coordinate position of the gazing point on the monitor display screen of the display block 554 on the basis of a cornea reflected image, cornea edge positions, and the like of the eyeball image. The circuit 561d supplies the calculated position to the system control block 557.

On the other hand, a ROM 562 which stores information including an index group corresponding to various functions and their coordinate positions is connected to the system control block 557. The system control block 557 displays various indices at predetermined positions on the monitor display screen via a display circuit 564 on the basis of the various indices and their coordinate information read out from the ROM 562. When it is detected based on the gazing point coordinate information supplied from the line of sight detection circuit 561d that the operator is gazing a given index, the system control block 557 selects a function corresponding to the gazed index, and executes the selected function when the operator depresses a function execution button included in the manual switches 558.

Also, a RAM 563 is connected to the system control block 557. As in the fifth embodiment described above, the RAM 563 stores pages that display various functions, the selected functions, and the like, which are used in control for displaying an initial page screen in the next use on the basis of these data. Also, various kinds of information are recorded in, read out from, and saved in the RAM 563.

In the example shown in FIG. 12, one of various functions displayed on the monitor screen is selected based on line of sight detection. As in the fifth embodiment described above, two-dimensional pointing devices such as a tracking ball, cross-cursor keys, a joystick, and the like may be used, and the line of sight detection block 561 in FIG. 12 may be replaced by such two-dimensional pointing device.

The circuit arrangements in the fifth and sixth embodiments are represented by the arrangement shown in FIG. 12, and the operations of the fifth and sixth embodiments are realized by the system control block 557. Furthermore, the system control block 557 executes an operation corresponding to the display switch function in accordance with a detection signal which is output upon detection of a coincidence between the gazing position detected by the line of sight detection circuit 561d and one of the display positions of switch functions displayed on the display block 554.

The camera built-in type VTR has an eye-controlled automatic distance measurement function of measuring the distance to an object displayed at the gazing position of the operator on the viewfinder which is obtained by the gazing position detection circuit, and adjusting the focusing state of the lens to the object. On the viewfinder, a distance measurement frame (510a in FIG. 13) indicating the gazing position of the operator is displayed.

Figure 13:
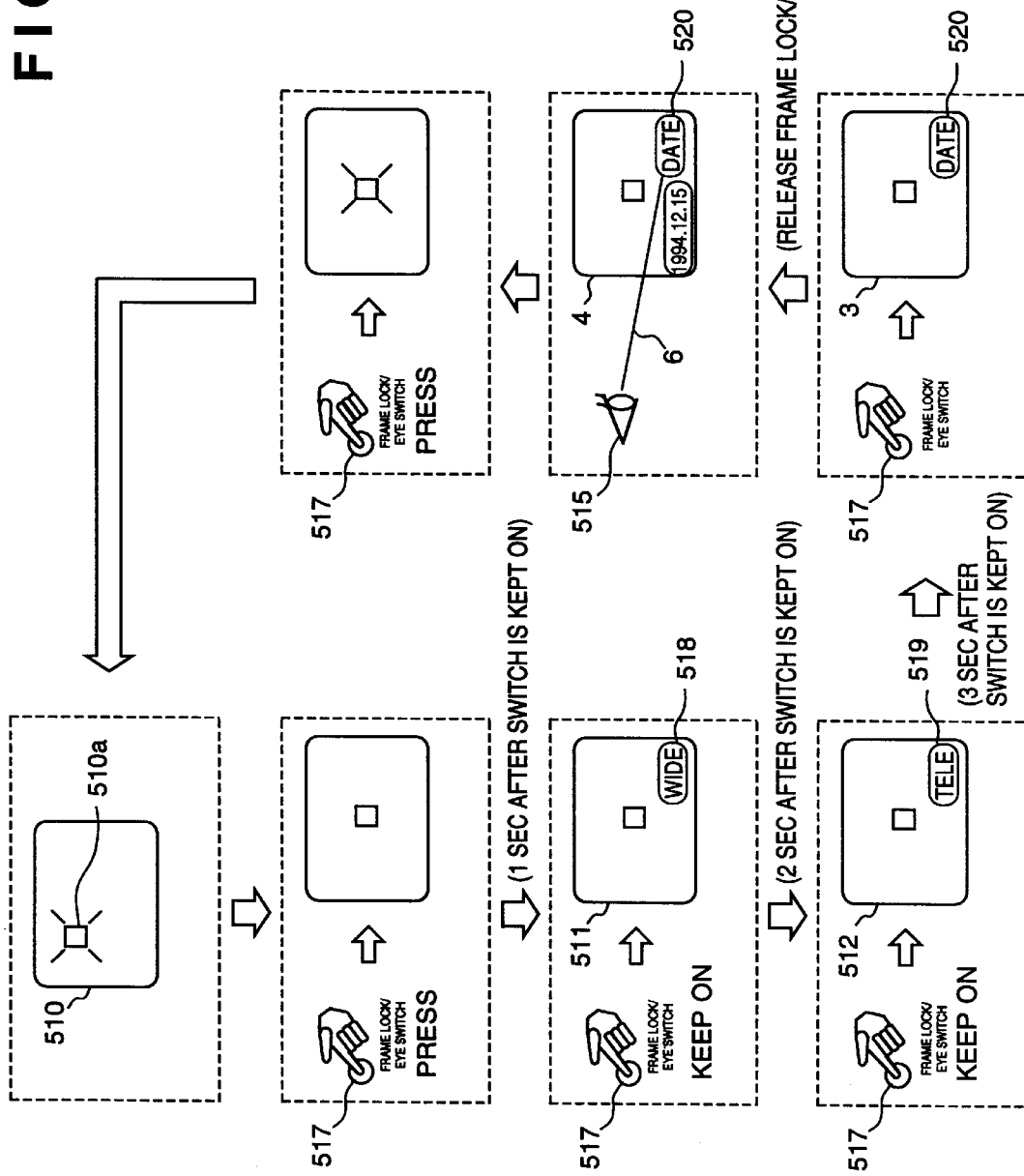
FIG. 13 is an explanatory view showing the operation of the sixth embodiment.
Figure 14:
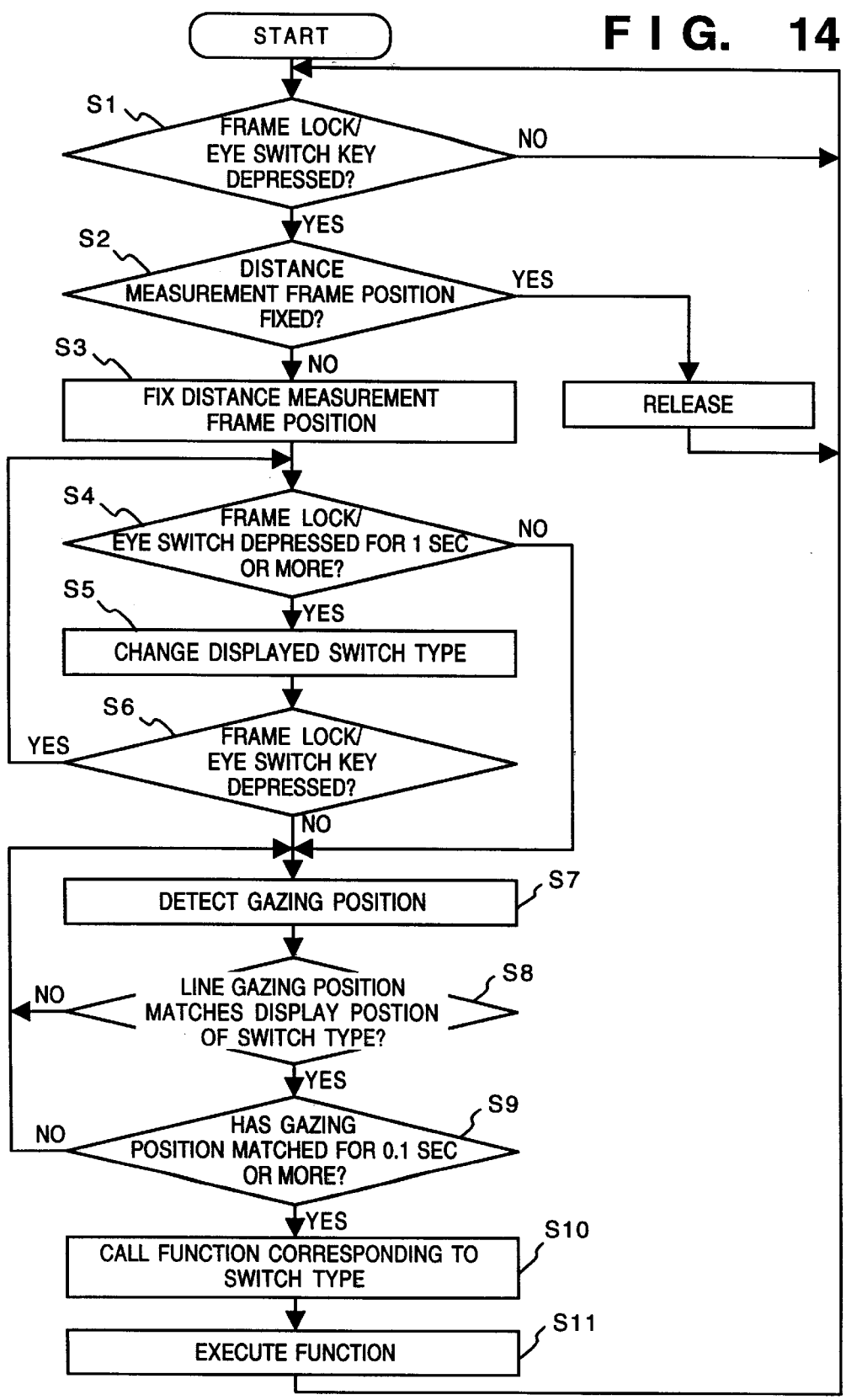
FIG. 14 is a flow chart of the sixth embodiment.

FIG. 13 is a view for explaining the operation of the sixth embodiment, and FIG. 14 shows the control sequence of the sixth embodiment.

Referring to FIG. 13, reference numeral 511 to 514 denote page screens on which switch functions are displayed; and 518 to 520, display areas of the switch functions. Reference numeral 515 denotes an eye of the operator; and 516, a line of sight of the operator.

Reference numeral 517 denotes a switch arranged on the VTR main body. The switch 517 is called "FRAME LOCK/EYE SWITCH". This switch 517 has both a function of changing the display states of the switch functions, and a function of canceling the automatic distance measurement function by fixing the position of the distance measurement frame 510a.

A case will be explained in detail below wherein an operator performs a date print operation on an image to be recorded in the sixth embodiment.

When the operator looks into the viewfinder, a page screen 510 shown in FIG. 13 is displayed on the screen. A distance measurement frame is being displayed and moves to follow line of sight. When the operator depresses the "FRAME LOCK/EYE SWITCH" 517, the position of the distance measurement frame 510a is fixed, and the automatic distance measurement function is canceled (steps S1 to S3 in FIG. 14).

One second later, the display state of the switch function is changed (steps S4 and S5), and the page screen 511 for displaying a given switch function is displayed on the screen of the viewfinder. The switch function (area 518) displayed on this page screen 511 is "WIDE" having a function of moving the lens to the wide-angle end in the zoom function of the lens of the camera built-in type VTR, but a switch function that can execute a date print function is not displayed.

Thus, the operator further keeps depressing the "FRAME LOCK/EYE SWITCH" 517 (step S6).

One second later, the display state changes, and the page screen 512 is displayed on the screen of the viewfinder. However, the switch function (area 519) displayed on this page screen 512 is "TELE" having a function of moving the lens toward the telephoto side, but the switch function that can execute the date print function is not displayed here. For this reason, the operator further keeps depressing the "FRAME LOCK/EYE SWITCH" 517 (steps S6 and S4).

Another second later, the display state of the switch function changes (S5), and the page screen 513 is displayed on the screen of the viewfinder. Since this page screen 513 displays "DATE" (area 520) as the switch function that can execute the date print function, the operator releases his or her finger from the "FRAME LOCK/EYE SWITCH" 517 (step S6, No).

In this state, when the operator gazes "DATE" (area 520), the date print function is executed (S11) by the line of sight detection function (S7, S8, S9, and S10).

When the "FRAME LOCK/EYE SWITCH" 517 is depressed while the distance measurement frame is fixed in position, the fixed state of the distance measurement frame is released.

The function of the above-mentioned "FRAME LOCK/EYE SWITCH" 517 is as follows. More specifically, when the depression duration of the "FRAME LOCK/EYE SWITCH" 517 is:

less than one second:
  only a function of fixing the distance measurement frame is executed;
more than one second and less than 2 seconds:
  the distance measurement frame is fixed and the switch function is changed once;
more than 2 seconds and less than 3 seconds:
  the distance measurement frame is fixed and the switch function is changed twice; and
more than 3 seconds and less than 4 seconds:
  the distance measurement frame is fixed and the switch function is changed three times.

When the switch 517 is depressed while the distance measurement frame is fixed, the fixed state of the distance measurement frame is released.

In the fifth and sixth embodiments, the page screen selection is attained by the switch operation. In this case, the switch is a specific switch or a switch commonly used as an existing switch. In the seventh embodiment and the subsequent embodiments to be described below, a page screen selection is attained by repeating an operation for selecting an icon, which is set at a predetermined position on a page screen and has a function of sequentially turning page screens, until a target page screen is displayed.

<Seventh Embodiment>

An example of the switch selection arrangement in a camera built-in type VTR according to the seventh embodiment of the present invention will be described in detail below with reference to FIG. 15.

Figure 15:
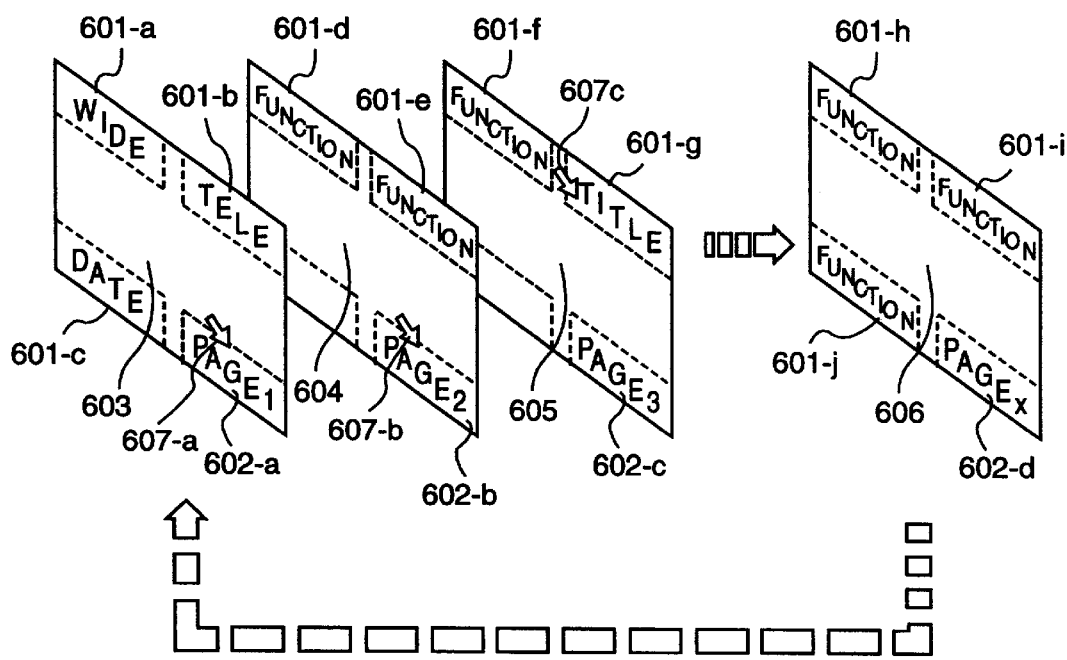
FIG. 15 is an explanatory view showing the display state on the screen of a viewfinder according to the seventh embodiment of the present invention.

FIG. 15 is an explanatory view of switch types displayed on the screen of a viewfinder of this VTR.

Referring to FIG. 15, reference numerals 601-a ("WIDE") to 601-j ("FUNCTION") and 602-a ("PAGE1") to 602-d ("PAGEx") denote the display areas of switch types to be operated; 603, 604, 605, and 606, page screens on which combinations of these switch types are displayed. Especially, the display areas 602-a ("page1") to 602-d ("pagex") correspond to icons that instruct to change the combinations of the displayed switch types.

Reference numerals 607-a to 607-c denote cursors. The display position of the cursor is designated by a pointing device such as a tracking ball, cross-cursor keys, or the like, arranged on the VTR main body. When the operator sets the cursor position at the display position of an arbitrary switch type and depresses an "execution" key (not shown) arranged on the VTR main body, a function corresponding to the selected switch type is executed.

A case will be explained in detail below wherein the operator selects a function of printing a title created in advance onto an image to be recorded (i.e., "TITLE" function) in the above arrangement.

When the operator looks into the viewfinder, the page screen 603 is displayed. On this page screen, the switch types are displayed in combination. However, this page screen 603 does not display any switch ("TITLE") that can execute the title print function.

The operator then sets the position of the cursor 607-a at the position of the "PAGE1" icon 602-a and depresses the "execution" key (not shown). The "PAGE1" icon 602-a corresponds to a switch type that can execute a function of changing the combination of switch types to be displayed.

With this operation, the page screen displayed on the viewfinder changes to the page screen 604. However, the page screen 604 does not display any switch type that can execute the title print function, either. For this reason, the operator sets the position of the cursor 607-b at the position of the "PAGE2" icon 602-b, and depresses the "execution" key.

Then, the page screen displayed on the viewfinder changes to the page screen 605. Since this page screen 605 displays the "TITLE" icon 601-g, the operator sets the position of the cursor 607-c at the position of the "TITLE" icon 601-g and depresses the "execution" key. After this operation, the title print function is executed.

In this embodiment, x different combinations of switch types are available. On the page screen 606 that shows the x-th combination of switch types, the "PAGEx" icon 605-d is displayed. In this state, when the operator sets the cursor position on the "PAGEx" icon 605-d and depresses the "execution" key, the page screen displayed on the viewfinder returns to the page screen 603. For example, when the operator wants to execute a date print function ("DATE") onto an image to be recorded as one of the functions of the camera built-in type VTR after he or she executes the title print function, he or she selects "PAGEx" on the page screen 606 to redisplay the page screen 603. Thereafter, the operator sets the position of the cursor 607-a at the position of the "DATE" icon 601-c and depresses the "execution" key.

The eighth to 10th embodiments as modifications of the seventh embodiment will be described below. The eighth to 10th embodiments are the substantially the same as the seventh embodiment except that they adopt an eye-controlled switch.

Figure 19:
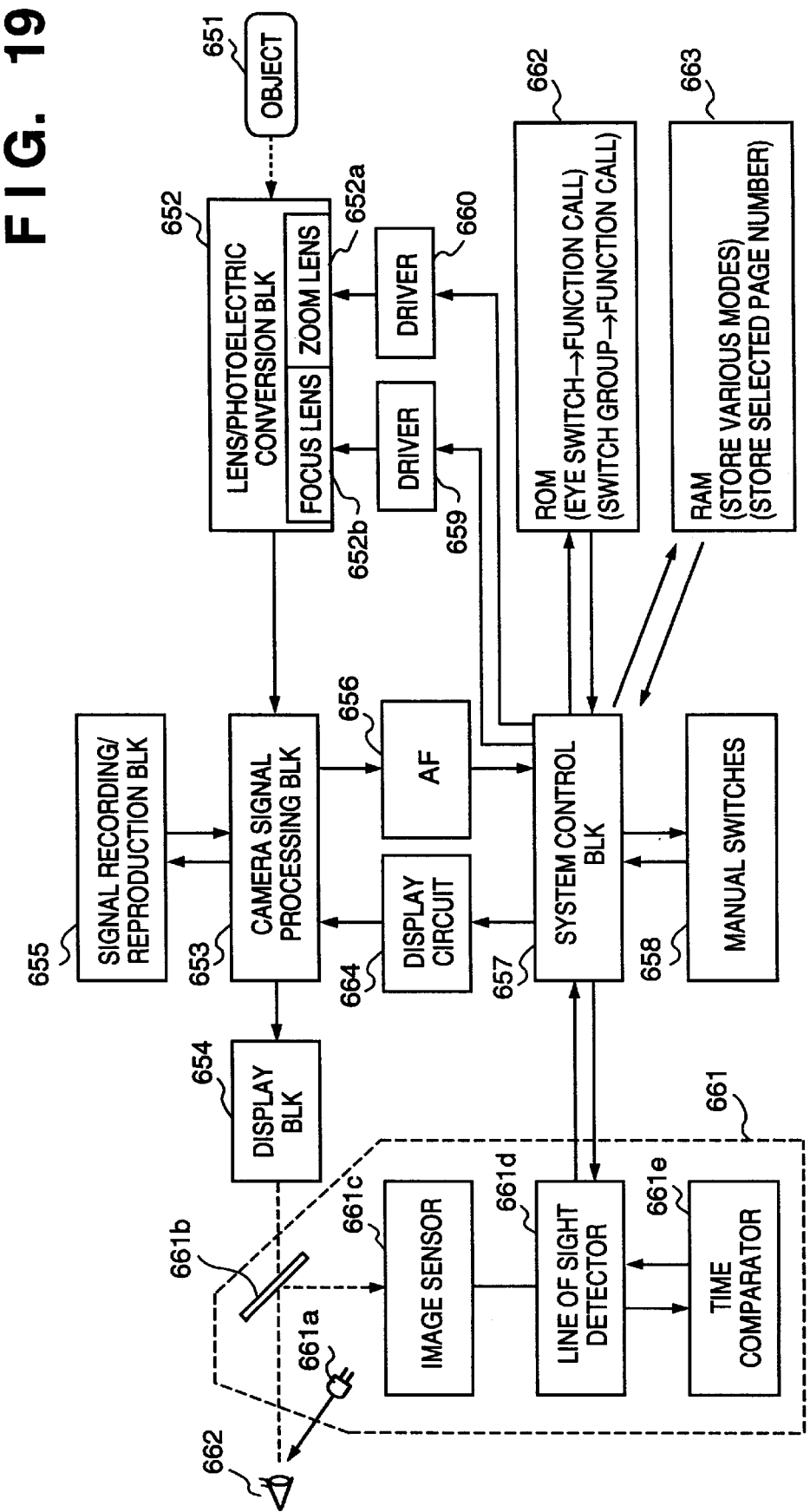
FIG. 19 is a block diagram showing an example wherein the seventh to 10th embodiments are applied to a camera built-in type VTR.

FIG. 19 is a block diagram showing an application example to a camera built-in type VTR common to the eighth to 10th embodiments of the present invention.

Referring to FIG. 19, an image of an object 651 is picked up by an image pickup block (lens/photoelectric conversion block) 652 which comprises a zoom lens 652a, a focus lens 652b, and a photoelectric conversion block including an image pickup element such as a CCD for photo-electrically converting an object image formed by these lenses and outputting an image pickup signal. The picked-up object image is converted into an image pickup signal, which is output.

The image pickup signal output from the image pickup block 652 is converted into a standardized video signal by a camera signal processing block 653, and is monitored on a display block 654 comprising, e.g., a viewfinder. Also, the video signal is supplied to a signal recording/reproduction block 655 comprising, e.g., a VTR, and is recorded on a recording medium such as a magnetic tape.

When the signal recording/reproduction block 655 reproduces a recorded video signal from, e.g., a magnetic tape, an image can be reproduced and monitored on the display block via the camera signal processing block 653.

The camera signal processing block 653 separates some signal components of the image pickup signal supplied from the image pickup block 652, and supplies them to a focus detection circuit (AF circuit) 656. The AF circuit 656 extracts, e.g., a high-frequency component, which changes in correspondence with the focusing stale, of the image pickup signal using a predetermined filter, and detects the component as a focus evaluation value at field periods.

The focus evaluation value detected by the AF circuit 656 is supplied to a system control block 657 which systematically controls the entire video camera system. The system control block 657 controls a driver 659 to drive the focus lens 652b so as to maximize the focus evaluation value detected at the field periods, thus performing an automatic focus adjustment operation.

A manual switch group 658 including various operation switches is connected to the system control block 657. The system control block 657 recognizes the operation of each of these manual switches, and performs control and execution of a corresponding one of various functions in correspondence with the operation.

The manual switches 658 include a zoom switch. When the zoom switch is operated toward the TELESCOPE or WIDE side, the system control block 657 controls a driver 660 to drive the zoom lens in correspondence with the operation.

A function selection operation for displaying indices corresponding to various functions that can be executed in the camera built-in type VTR in advance on the monitor display screen of the display block 664, and selecting a function corresponding to a given index gazed by an operator will be explained below.

Reference numeral 661 denotes a line of sight detection block for detecting the gazing point of the operator on the monitor display screen of the display block 654.

An eyeball 662 of the operator who is observing the monitor display screen of the display block 654 is illuminated with light emitted by an infrared LED (IRED) 661a, and the obtained eyeball image is reflected by a dichroic mirror 661b which transmits visible light and reflects infrared rays, thereby forming an eyeball image on an image sensor 661c.

The eyeball image formed on the image sensor 661c is photo-electrically converted, and the converted signal is supplied to a line of sight detection circuit 661d. The detection circuit 661d calculates the coordinate position of the gazing point on the monitor display screen of the display block 654 on the basis of a cornea reflected image, cornea edge positions, and the like of the eyeball image. The circuit 661d supplies the calculated position to the system control block 657.

On the other hand, a ROM 662 which stores information including an index group corresponding to various functions and their coordinate positions is connected to the system control block 657. The system control block 657 displays various indices at predetermined positions on the monitor display screen via a display circuit 664 on the basis of the various indices and their coordinate information read out from the ROM 662. When it is detected based on the gazing point coordinate information supplied from the line of sight detection circuit 661d that the operator is gazing a given index, the system control block 657 selects a function corresponding to the gazed index, and executes the selected function when the operator depresses a function execution button included in the manual switches 658.

Also, a RAM 663 is connected to the system control block 657. As in the seventh embodiment described above, the RAM 663 stores pages that display various functions, the selected functions, and the like, which are used in control for displaying an initial page screen in the next use on the basis of these data. Also, various kinds of information are recorded in, read out from, and saved in the RAM 663.

In the VTR shown in FIG. 19 (i.e., the VTR of the eighth to 10th embodiments), one of various functions displayed on the monitor screen is selected based on line of sight detection. As in the se venth embodiment described above, two-dimensional pointing devices such as a tracking ball, cross-cursor keys, a joystick, and the like may be used, and the line of sight detection block 661 in FIG. 19 may be replaced by such two-dimensional pointing device.

The circuit arrangements of the eighth to 10th embodiments to be described below are represented by the arrangement shown in FIG. 19.

<Eighth Embodiment>

Figure 16:
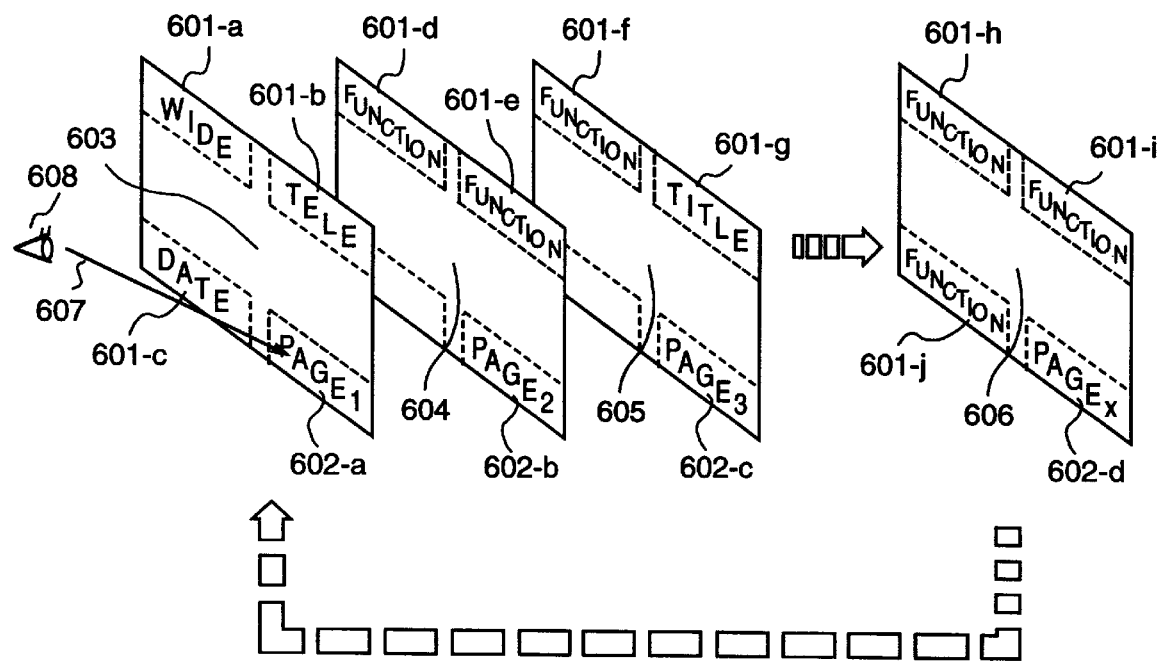
FIG. 16 is an explanatory view showing the display state on the screen of a viewfinder according to the eighth embodiment of the present invention.
Figure 20:
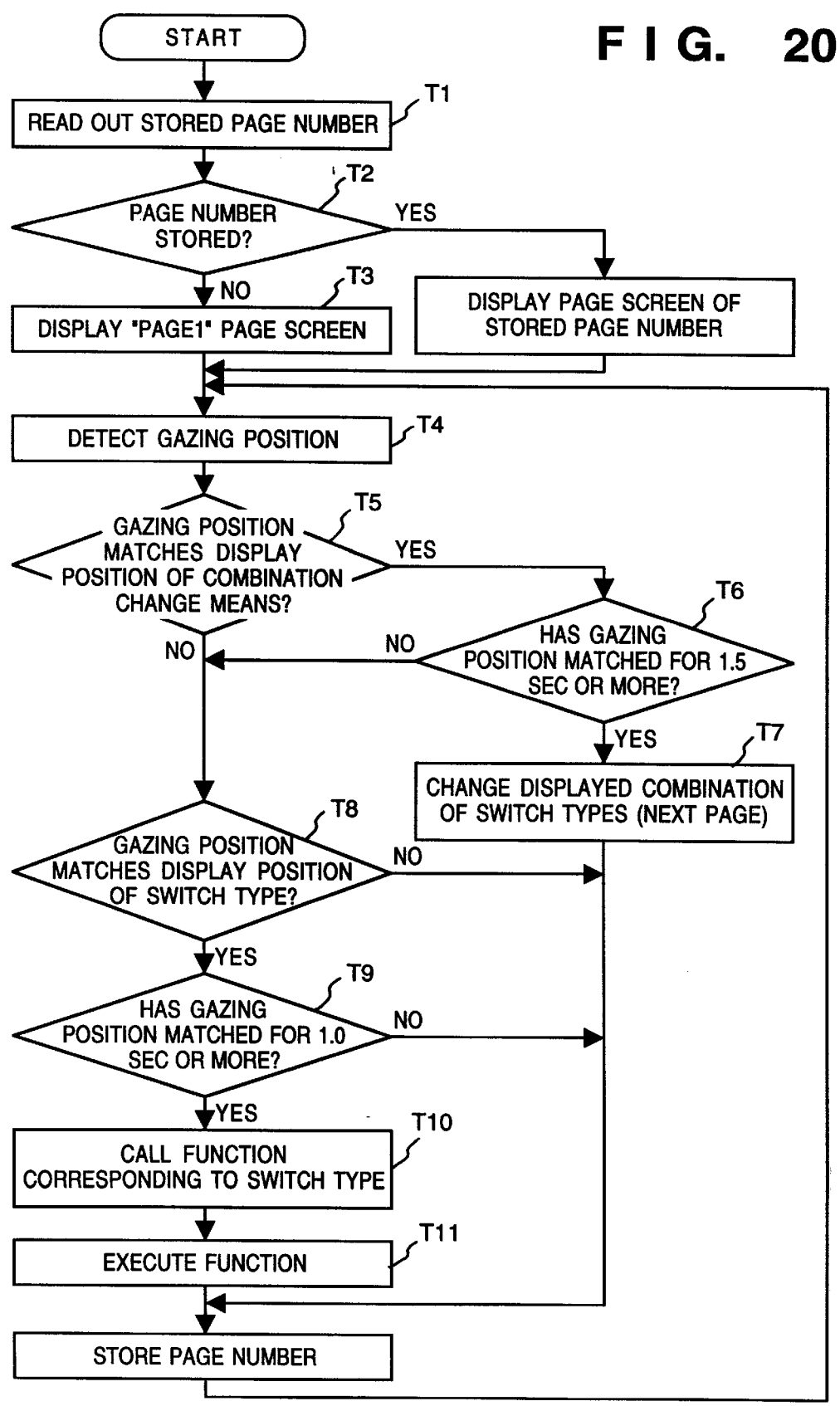
FIG. 20 is a flow chart of the eighth embodiment.

FIG. 16 is an explanatory view of the display state in the viewfinder of the eighth embodiment, and FIG. 20 is a flow chart showing the operation control of the eighth embodiment. The following description will be made with reference to FIGS. 16 and 20.

Referring to FIG. 16, reference numerals 601-a to 601-j and 602-a to 602-d denote display areas indicating switch types to be operated by the line of sight of the operator; and 603, 604, 605, and 606, page screens displayed on the viewfinder. Especially, the display areas 602-a to 602-d correspond to icons of switches for changing the display state.

Reference numeral 608 denotes an eye of the operator; and 607, a line of sight of the operator. Assume that the operator looks at the "PAGE1" icon 602-a.

A case will be explained in detail below wherein the operator selects a function ("TITLE") of printing a title created in advance onto an image to be recorded in the above arrangement.

When the operator looks into the viewfinder, the page screen 603 that shows a combination of switch types is displayed on the screen (T1 to T3). However, this page screen does not display any switch type that can execute the title print function. Thus, the operator looks at "PAGE1" icon 602-a (T6, T7).

With this operation, the page screen displayed on the viewfinder changes to the page screen 604. However, this page screen 604 does not display any switch that can execute to the "TITLE" function, either. The operator then looks at the "PAGE2" icon 602-b. Then, the page screen displayed on the viewfinder changes to the page screen 605. Since this page screen displays the "TITLE" icon 601-g, the operator looks at the "TITLE" icon 601-g (T5, T8, T9). In this manner, the title print function is executed (T10, T11).

In this embodiment, x different combinations of switch types are available, and the page screen 606, which displays the x-th combination of switch types displays the "PAGEx" icon 602-d. On this page screen, when the operator looks at the "PAGEX" icon 602-d, the displayed page screen returns to the page screen 603 which displays the 1-st combination of switch types. For example, when the operator wants to execute a date print function as one of the functions of the camera built-in type VTR after he or she executes the title print function, this object can be attained when the operator looks at the "DATE" icon 601-c as a switch type icon that can execute the date print function on the page screen 603, which is displayed after the above-mentioned procedure.

As compared to the seventh embodiment that operate the switches 602-a to 602-d as icons for designating a jump destination page using a manual switch, the eighth embodiment described above operates the switches 602-a to 602-d as jump destination page icons using an eye switch.

<Ninth Embodiment>

Figure 17:
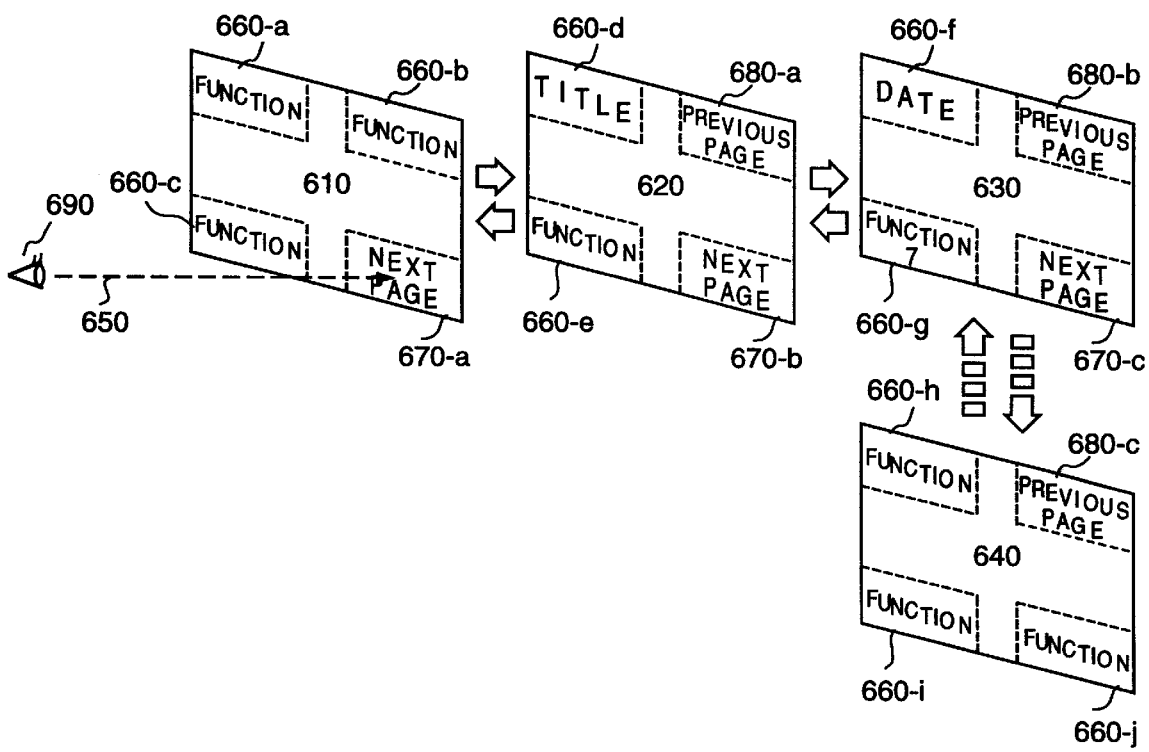
FIG. 17 is an explanatory view showing the display state on the screen of a viewfinder according to the ninth embodiment of the present invention.

The ninth embodiment will be described below with reference to the explanatory view of the display state in a viewfinder in FIG. 17, and the flow chart in FIG. 20.

Referring to FIG. 20, reference numerals 660-a to 660-j, 670-a to 670-c, and 680-a to 680-c denote display areas (icons) of eye switches; and 610, 620, 630, and 640, page screens displayed on the viewfinder. Especially, the icons 670-a to 670-c and 680-a to 680-c are used for instructing to change the combination of icons.

Also, reference numeral 690 denotes an eye of an operator; and 650, a line of sight of the operator. Assume that the operator looks at "NEXT PAGE" icon 670-a.

A case will be explained in detail below wherein the operator wants to execute a "DATE" function.

When the operator looks into the viewfinder, the page screen 610 that displays a combination of switch types is displayed on the screen of the viewfinder (T21 to T24). However, this page screen does not display "DATE".

Then, the operator looks at the "NEXT PAGE" icon 670-a. The gazing position of the operator is detected (T25, T26). As a result of the detection, the page screen displayed on the viewfinder changes to the page screen 620 (T27, T28). However, this page screen does not display any switch type icon that can execute the "DATE" function, either. For this reason, the operator looks at the "NEXT PAGE" icon 670-b (T25 to T28). The page screen displayed on the viewfinder is switched to the page screen 630, and this page screen displays the "DATE" icon 660-f that can execute the date print function. Thus, the operator looks at the "DATE" icon 660-f (T29). In this manner, the date print function is executed (T31, T32).

When the operator wants to execute a title print function ("TITLE") from this state, he or she looks at "PREVIOUS PAGE" icon 680-b on the page screen 630 (T33, T34). Thus, the page screen to be displayed returns to the page screen 620 (T35). When the operator looks at the "TITLE" icon 660-d as the title print function displayed on this page screen, the title print function is executed (T29 to T32).

As described above, the ninth embodiment can provide a user interface wherein a plurality of page screens are prepared on the viewfinder screen, and the operator can reach a desired page by gazing the "NEXT PAGE" eye switch or "PREVIOUS PAGE" eye switch.

<10th Embodiment>

The 10th embodiment is the same as the seventh to ninth embodiments in that a plurality of page screens are prepared on the viewfinder screen, but is different from them in that a page selection page serving as a jump start point to an arbitrary page is prepared.

The 10th embodiment will be described below with reference to FIG. 18.

Figure 18:
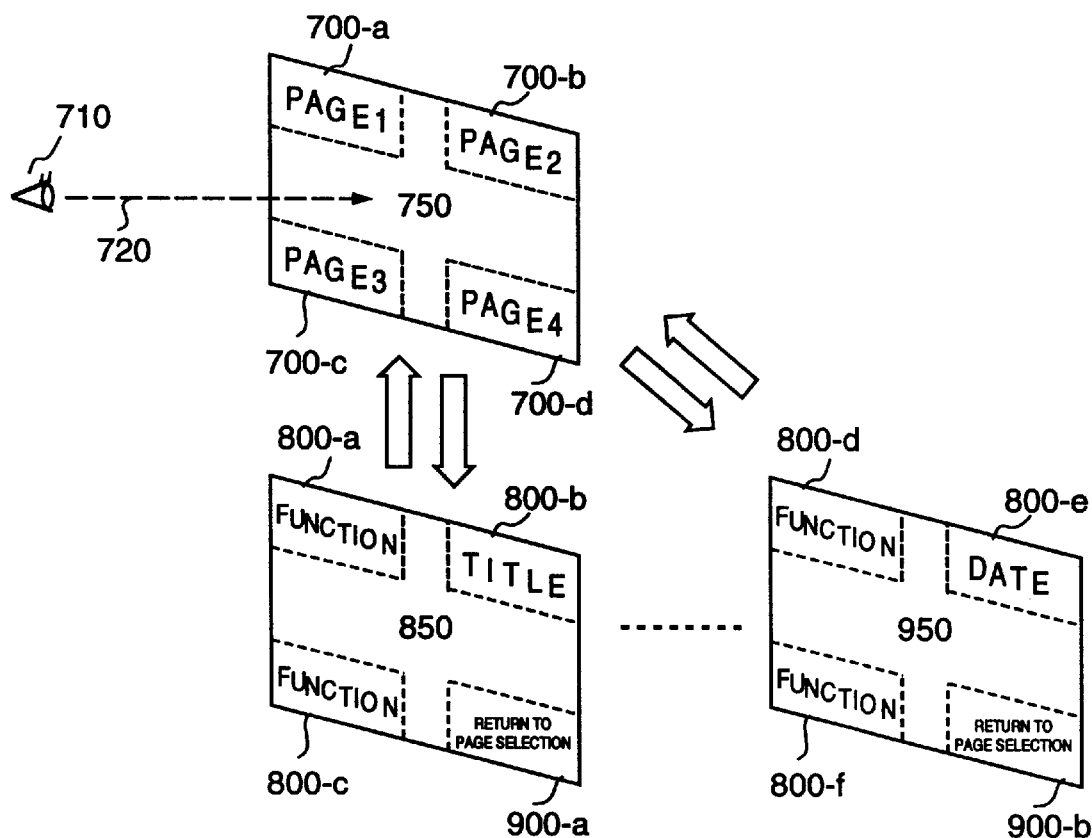
FIG. 18 is an explanatory view showing the display state on the screen of a viewfinder according to the 10th embodiment of the present invention.

Referring to FIG. 18, reference numerals 700-a to 700-d, 800-a to 800-f, and 900-a to 900-d denote icons of eye switches operated based on the line of sight of an operator; and 750, 850, and 950, page screens displayed on the viewfinder. Especially, the icons 700-a to 700-d, and 900-a, and 900-b serve as eye switches for instructing to change the displayed page using a line of sight 720 of an operator's eyeball 710.

A case will be explained in detail below wherein the operator executes a date print function in the above arrangement.

When the operator looks into the viewfinder, the page screen 750 which displays a page selection page is displayed (T41, T42, T44). The page screen 750 displays eye switch icons (PAGE1 to PAGE4) that display the page numbers as jump destinations. Assume that the operator knows that a "DATE" function is displayed on "PAGE4". Thus, the operator looks at the "PAGE4" icon 700-d on the page selection page screen 750 to jump the page to the page screen 950 (PAGE4) which displays the eye switch of the "DATE" function.

With this operation, the page screen displayed on the viewfinder screen is switched to the page screen 950

(PAGE4) (T45 to T49). Since this page displays "DATE" icon 800-*e*, the operator looks at this "DATE" icon 800-*e*. With this operation, the date print function is executed (T50 to T54).

When the operator wants to execute a title print function ("TITLE") while the page screen 950 is displayed, he or she looks at the "RETURN TO PAGE SELECTION" icon 900-*b* (T50, T51, T55, T44).

With this operation, the page returns to the page screen 750 that displays the page selection page. In this case, since the operator knows that "TITLE" is displayed on "PAGE1", he or she looks at the "PAGE1" icon 700-*a* on the page screen 750. With this operation, the page screen displayed on the viewfinder is switched to the page screen 850 (PAGE1), and the operator looks at the "TITLE" icon 800-*b* to execute the title print function (T45 to T54).

As described above, the 10th embodiment can provide an easy-to-use user interface since the interface has a plurality of eye switches for page selection on the page selection page.

<Modification>

Figure 21:
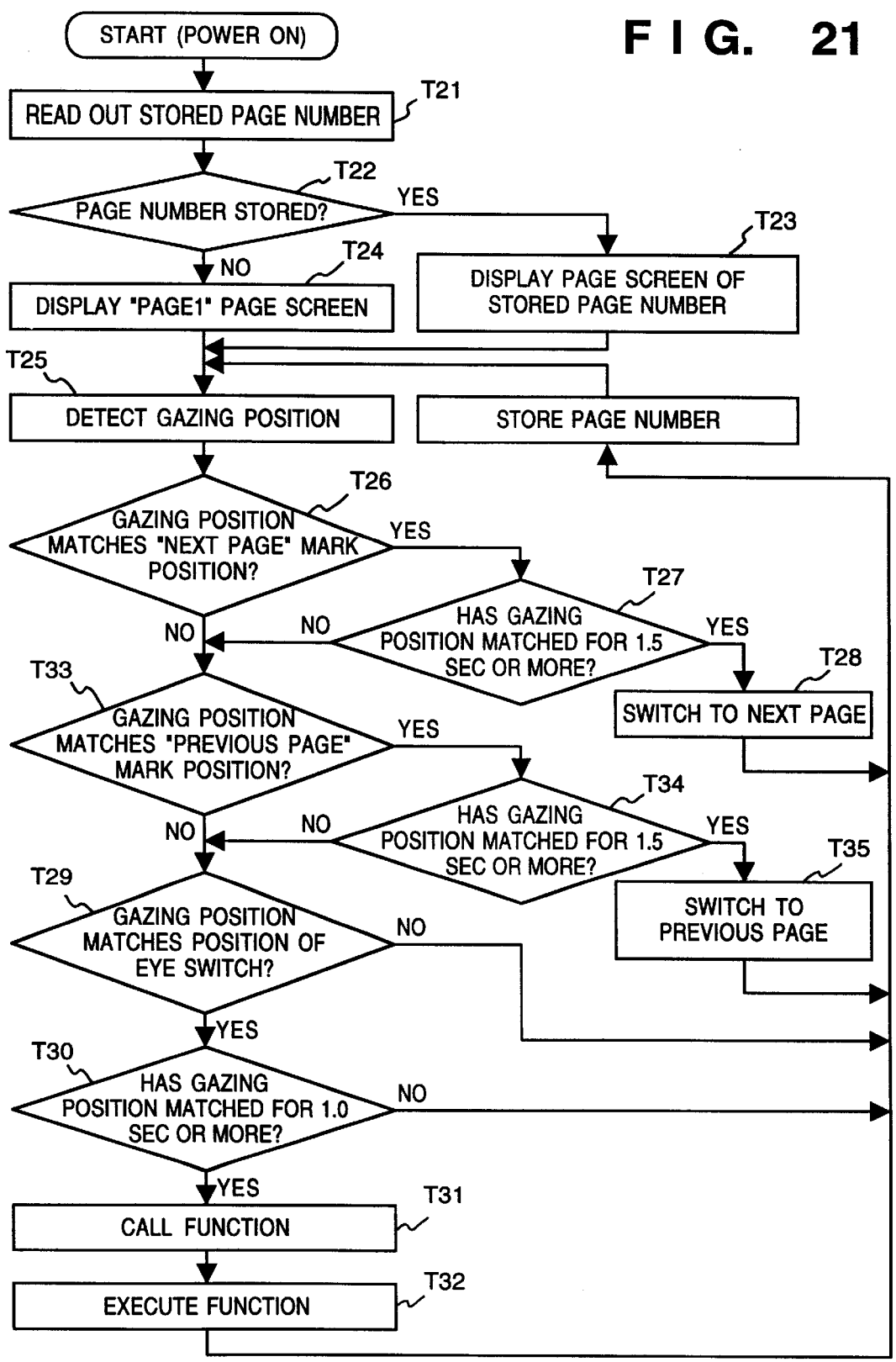
FIG. 21 is a flow chart of the ninth embodiment.
Figure 22:
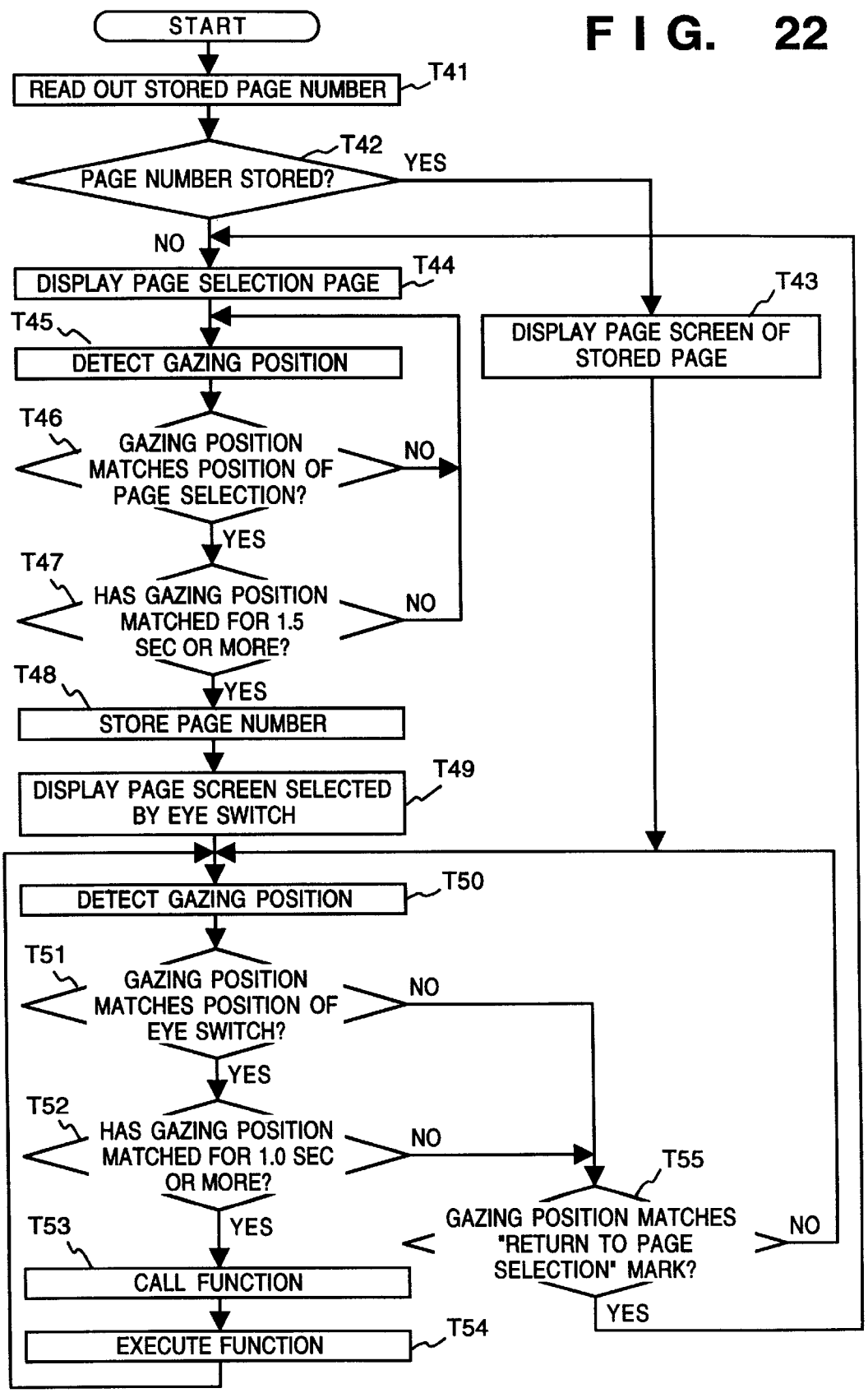
FIG. 22 is a flow chart of the 10th embodiment.

In FIGS. 20 to 22 which respectively show the control sequences of the eighth to 10th embodiments, the time required for enabling an eye switch is set to be about 1.5 seconds especially for an eye switch for changing the page screen, and is set to be about 1.0 second for other eye switches (e.g., an eye switch for selecting a specific function). Since the operation for changing the page screen requires a relatively long gazing time, an operation error can be prevented.

In a modification to be described below, a means for storing a page screen (page number or the like) displayed when the power switch of the VTR is turned off is arranged. When the power switch is turned on again, the page number of the page screen displayed when the power switch was turned off is read from the storage means, and the corresponding page is displayed.

As many apparently widely different embodiments of the present invention can be made without departing from the spirit and scope thereof, it is to be understood that the invention is not limited to the specific embodiments thereof except as defined in the appended claims.

What is claimed is:

1. A function setting apparatus for selecting one of a plurality of functions of an electronic device, and setting the selected function to be executed by the electronic device, comprising:

upper-level eye-controlled menu display means for displaying a list of a plurality of upper-level function menu items on a predetermined display screen so that an arbitrary one of the function menu items can be designated by a line of sight of an operator; and lower-level eye-controlled menu display means for, when the line of sight of an operator is detected in correspondence with one of the plurality of upper-level function menu items displayed by said upper-level eye-controlled menu display means, displaying a lower-level eye-controlled menu comprising a list of a plurality of lower-level function menu items associated with the designated one upper-level function menu item on the display screen, whereby an arbitrary one of the function items of the lower-level function menu can be designated by line of sight.

2. The apparatus according to claim 1, wherein one upper-level function menu item includes a function type name which summarizes a plurality of lower-level function menu items corresponding to the function menu item.

3. The apparatus according to claim 1, further comprising middle-level eye-controlled menu display means for displaying at least one middle-level function menu item, located between the upper- and lower-level function menu items on the display screen, so that an arbitrary one of the at least one middle-level function menu items can be designated by the line of sight.

4. The apparatus according to claim 1, wherein said lower-level eye-controlled menu display means displays the plurality of upper-level function menu items on one page, and displays a selected first upper-level function menu item to be identifiable from other upper-level function menu items, and displays the lower-level function menu items corresponding to the first upper-level function menu item on the identical page.

5. The apparatus according to claim 4, wherein said lower-level eye-controlled menu display means comprises:

means for detecting that an arbitrary second upper-level function menu item other than the first upper-level function menu displayed on the page is selected by the line of sight; and means for displaying the second upper-level function menu item to be identifiable from other upper-level function menu item, and displaying lower-level function menu items corresponding to the second upper-level function menu item.

6. The apparatus according to claim 1, further comprising a first manual operation switch for setting said setting apparatus in a mode in which said upper and lower-level eye-controlled menu display means are enabled.

7. The apparatus according to claim 1, wherein the display screen is arranged on a main body of the electronic device.

8. The apparatus according to claim 6, further comprising:

a second manual operation switch having a plurality of operation positions; and means for displaying one uppermost-level function menu item in correspondence with one of the operation positions of said second manual operation switch.

9. A user interface method for an electronic device, comprising the steps of:

displaying an upper-level menu comprising a list of a plurality of upper-level function memu items on a predetermined display screen so as to be designated by a line of sight of an operator;

specifying one of the plurality of displayed upper-level function items, which matches the line of sight; and displaying a lower-level eye-controlled menu comprising a list of a plurality of lower-level function menu items associated with the specified upper-level function menu item on the display screen so as to be designated by the line of sight.

10. The method according to claim 9, wherein contents of each of the upper-level function menu items include a general idea of the lower function menu items.

11. The method according to claim 9, wherein when one of the lower-level function menu items is selected by the line of sight, a function assigned to the selected lower-level function menu item is executed.

12. The method according to claim 9, wherein an upper-level function menu item and lower-level function menu items corresponding to the upper-level function menu item are displayed on an identical page screen.

13. The method according to claim 9, wherein an upper-level function menu item and lower-level function menu items corresponding to the upper-level function menu item are displayed on different page screens.

14. An electronic device which can selectively switch a plurality of upper-level functions of a hierarchical menu, comprising:

- display means for identifiably displaying symbols of the plurality of upper-level functions;
- eye controlled selection means for causing an operator to select, according to a gazing position of the operator, a one target upper-level function from the displayed upper-level functions;
- means for executing the selected one function;
- a sole switch for performing a manual operation for changing the selection of one of the plurality of upper-level functions, wherein the selection is dependent on length of an operation time of the sole switch;
- wherein said display means is also for displaying a lower level eye-controlled menu comprising a list of a purality of lower-Ievel function menu items associated with the selected one target upper-level function.

15. The device according to claim 14, wherein said display means displays the names of the upper-level functions on different page screens, and the page screen changes when the selection of the upper-level function is changed by the switch.

16. The device according to claim 14, wherein when the sole switch is operated while said electronic device is performing a predetermined operation, said electronic device is set in a mode for enabling said display means.

17. The device according to claim 14, further comprising:

- means for, when one of the upper-level function menu items displayed by said display means is selected, detecting if a display position of the selected one upper-level function menu item coincides with a gazing position of the operator; and
- means for displaying lower-level function menu items corresponding to the selected one upper-level function menu item upon detection of the coincidence.

18. The device according to claim 14, wherein display areas of the names of the plurality of upper-level function menu items are assigned to different page screens, and each of the page screens has a link display area for displaying a link to a next page.

19. The device according to claim 18, wherein one of the display areas of the names of the plurality of upper-level function menu items or the link display area is designated by the line of sight of the operator.

20. The device according to claim 19, wherein a window time required when one of the display areas of the names of the plurality of upper-level function menu items is designated by the line of sight is longer than a window time required when the link display area is designated by the line of sight.

21. The device according to claim 14, wherein display areas of the names of the plurality of upper-level function menu items are assigned to different page screens, and each of the page screens has a forward link display area for displaying a link to a next page and a backward link display area for displaying a link to a previous page.

22. The device according to claim 21, wherein one of the display areas of the names of the plurality of upper-level function menu items or the link display area is designated by the line of sight of the operator.

23. The device according to claim 22, wherein display areas of the names of the plurality of upper-level function menu items are assigned to different page screens, and a page screen having link display areas for linking to the respective pages is arranged.

\* \* \* \* \*

UNITED STATES PATENT AND TRADEMARK OFFICE
CERTIFICATE OF CORRECTION

PATENT NO. : 5,977,976
DATED : November 2, 1999
INVENTOR(S) : Masamine Maeda

It is certified that error appears in the above-identified patent and that said Letters Patent is hereby corrected as shown below:

Col. 2, line 30, before "→ OFF" insert -- ↵ --.

Col. 2, line 35, before ""→ TITLE" insert -- ↵ --.

Col. 8, line 26, before "position" insert -- gazing --.

Col. 20, line 66, delete "se venth" and insert therefor -- seventh --

Col. 21, line 46, delete "PAGEX" and insert therefor "PAGEx"

Col. 25, line 18, delete "Ievel" and insert therefor -- level --.

Signed and Sealed this

Tenth Day of April, 2001

Attest:

NICHOLAS P. GODICI

*Attesting Officer*   *Acting Director of the United States Patent and Trademark Office*